United States Patent
Boisvert et al.

(10) Patent No.: US 10,272,913 B2
(45) Date of Patent: Apr. 30, 2019

(54) REGENERATIVE BRAKING SYSTEM AND METHOD

(71) Applicant: CONSORTIUM DE RECHERCHE BRP—UNIVERSITE DE SHERBROOKE S.E.N.C., Sherbrooke (CA)

(72) Inventors: Maxime Boisvert, Sherbrooke (CA); Philippe Micheau, Sherbrooke (CA); Didier Mammosser, Metz (FR)

(73) Assignee: CONSORTIUM DE RECHERCHE BRP—UNIVERSITE DE SHERBROOKE S.E.N.C., Sherbrooke (CA)

( * ) Notice: Subject to any disclaimer, the term of this patent is extended or adjusted under 35 U.S.C. 154(b) by 0 days.

(21) Appl. No.: 15/566,806

(22) PCT Filed: Jun. 17, 2016

(86) PCT No.: PCT/IB2016/053630
§ 371 (c)(1),
(2) Date: Oct. 16, 2017

(87) PCT Pub. No.: WO2016/203452
PCT Pub. Date: Dec. 22, 2016

(65) Prior Publication Data
US 2018/0099675 A1    Apr. 12, 2018

Related U.S. Application Data

(60) Provisional application No. 62/181,156, filed on Jun. 17, 2015.

(51) Int. Cl.
*B60W 30/18* (2012.01)
*B60L 3/10* (2006.01)
(Continued)

(52) U.S. Cl.
CPC ....... *B60W 30/18127* (2013.01); *B60K 6/387* (2013.01); *B60K 6/48* (2013.01);
(Continued)

(58) Field of Classification Search
CPC ......... B60W 30/18; B60K 6/387; B60K 6/48; B60L 11/14; B60L 11/18; B60L 15/20; B60L 3/10; B60L 7/14
See application file for complete search history.

(56) References Cited

U.S. PATENT DOCUMENTS 5,654,887 A * 8/1997 Asa .......................... B60L 3/10
                                                        180/65.285
2003/0169002 A1   9/2003  Hughes
(Continued)

FOREIGN PATENT DOCUMENTS

| WO | 2007130015 A1 | 11/2007 |
|----|---------------|---------|
| WO | 2008122783 A2 | 10/2008 |
| WO | 2014064730 A1 | 9/2016  |

OTHER PUBLICATIONS

International Search Report and Written Opinion with regard to PCT/IB2016/053630 dated Aug. 10, 2016.
(Continued)

*Primary Examiner* — Eduardo Colon Santana
*Assistant Examiner* — Said Bouziane
(74) *Attorney, Agent, or Firm* — BCF LLP

(57) ABSTRACT

A method for recovering energy during braking of a vehicle is provided. The vehicle has at least one rotatable ground engaging member, a generator operatively connected to the at least one rotatable ground engaging member, and at least one energy storage device coupled to the generator. The method has the steps of: determining a speed of the vehicle; determining a desired slip of the at least one rotatable ground engaging member based at least in part on the speed of the
(Continued)

vehicle; and applying a braking torque to the at least one rotatable ground engaging member using the generator based at least in part on the desired slip. A regenerative braking system for a vehicle and a vehicle having such a system are also disclosed.

15 Claims, 11 Drawing Sheets

(51) Int. Cl.
<table>
<tr><td>B60L 7/14</td><td>(2006.01)</td></tr>
<tr><td>B60L 11/14</td><td>(2006.01)</td></tr>
<tr><td>B60L 11/18</td><td>(2006.01)</td></tr>
<tr><td>B60L 15/20</td><td>(2006.01)</td></tr>
<tr><td>B60K 6/48</td><td>(2007.10)</td></tr>
<tr><td>B60K 6/387</td><td>(2007.10)</td></tr>
<tr><td>B60W 10/02</td><td>(2006.01)</td></tr>
<tr><td>B60W 10/06</td><td>(2006.01)</td></tr>
<tr><td>B60W 10/08</td><td>(2006.01)</td></tr>
<tr><td>B60W 20/10</td><td>(2016.01)</td></tr>
<tr><td>B60W 20/15</td><td>(2016.01)</td></tr>
<tr><td>B60W 20/40</td><td>(2016.01)</td></tr>
</table>

(52) U.S. Cl.
CPC .............. *B60L 3/106* (2013.01); *B60L 3/108* (2013.01); *B60L 7/14* (2013.01); *B60L 11/14* (2013.01); *B60L 11/1861* (2013.01); *B60L 15/2009* (2013.01); *B60L 15/2054* (2013.01); *B60W 10/02* (2013.01); *B60W 10/06* (2013.01); *B60W 10/08* (2013.01); *B60W 20/10* (2013.01); *B60W 20/15* (2016.01); B60K 2006/4808 (2013.01); B60L 2200/12 (2013.01); B60L 2210/40 (2013.01); B60L 2240/12 (2013.01); B60L 2240/421 (2013.01); B60L 2240/423 (2013.01); B60L 2240/441 (2013.01); B60L 2240/443 (2013.01); B60L 2240/461 (2013.01); B60L 2240/463 (2013.01); B60L 2240/465 (2013.01); B60L 2240/507 (2013.01); B60L 2240/547 (2013.01); B60L 2240/622 (2013.01); B60L 2250/12 (2013.01); B60L 2250/16 (2013.01); B60L 2250/24 (2013.01); B60L 2260/44 (2013.01); B60L 2270/145 (2013.01); B60W 20/40 (2013.01); B60W 2300/36 (2013.01); B60W 2520/10 (2013.01); B60W 2520/26 (2013.01); B60W 2520/28 (2013.01); B60W 2540/10 (2013.01); B60W 2540/12 (2013.01); B60W 2710/021 (2013.01); B60W 2710/083 (2013.01); B60W 2720/26 (2013.01); Y02T 10/626 (2013.01); Y02T 10/6221 (2013.01); Y02T 10/6286 (2013.01); Y02T 10/645 (2013.01); Y02T 10/70 (2013.01); Y02T 10/705 (2013.01); Y02T 10/7005 (2013.01); Y02T 10/7044 (2013.01); Y02T 10/7077 (2013.01); Y02T 10/7241 (2013.01); Y02T 10/7275 (2013.01); Y02T 10/7291 (2013.01); Y02T 10/92 (2013.01); Y02T 90/16 (2013.01); Y02T 90/162 (2013.01)

(56) References Cited

U.S. PATENT DOCUMENTS

<table>
<tr><td>2006/0289208 A1</td><td></td><td>12/2006</td><td>Katsuhiro et al.</td><td></td></tr>
<tr><td>2008/0283322 A1</td><td></td><td>11/2008</td><td>Gruber et al.</td><td></td></tr>
<tr><td>2010/0042280 A1</td><td></td><td>2/2010</td><td>Cominetti</td><td></td></tr>
<tr><td>2010/0243349 A1</td><td></td><td>9/2010</td><td>Nomura et al.</td><td></td></tr>
<tr><td>2014/0297079 A1*</td><td></td><td>10/2014</td><td>Saitoh ................... B60K 6/485</td><td>701/22</td></tr>
<tr><td>2015/0175009 A1*</td><td></td><td>6/2015</td><td>Beever ................. B60K 7/0007</td><td>701/22</td></tr>
<tr><td>2015/0344018 A1*</td><td></td><td>12/2015</td><td>Shimoyama ............. B60K 6/48</td><td>701/22</td></tr>
<tr><td>2016/0039312 A1*</td><td></td><td>2/2016</td><td>Kato ....................... B60L 15/20</td><td>701/22</td></tr>
</table>

OTHER PUBLICATIONS

Boisvert et al., "Comparison of two strategies for optimal regenerative braking, with their sensitivity to variations in mass, slope and road condition", 7th IFAC Symposium on Advances in Automotive Control, 2013, vol. 7, Part 1, pp. 626-630.

Boisvert et al., "Simulated and Experimental Comparisons of Slip and Torque Control Strategies for Regenerative Braking in Instances of Parametric Uncertainties", Journal of Robotics and Mechatronics, 2015, vol. 27, No. 3, pp. 1-9.

Falcone et al., "Predictive Approaches to Rear Axle Regenerative Braking Control in Hybrid Vehicles", 48th IEEE Conference on Decision and Control and 28th Chinese Control Conference, 2009, pp. 7627-7632.

Guo et al., "Regenerative Braking Strategy for Electric Vehicles", IEEE intelligent vehicle symposium, 2009, pp. 864-868.

Hancock et al., "Impact of regenerative braking on vehicle stability", IET Hybrid Vehicle Conference, 2006, pp. 173-184.

Harada et al., "Range extension control system for electric vehicles based on optimal-deceleration trajectory and front-rear driving-braking force distribution considering maximization of energy regeneration", IEEE 13th International Workshop on Advanced Motion Control (AMC), 2014, pp. 173-178.

Huang et al., "Nonlinear Model Predictive Control for Improving Energy Recovery for Electric Vehicles during Regenerative Braking", 50th IEEE Conference on Decision and Control and European Control Conference (CDC-ECC), 2011, pp. 7458-7463.

Koehler et al., "Optimized Recuperation Strategy for (Hybrid) Electric Vehicles Based on Intelligent Sensors", 12th International Conference on Control, Automation and Systems, ICC, 2012, pp. 218-223.

Liang et al., "Optimal regenerative torque control to maximise energy recapture of electric vehicles", World automation congress, 2010, pp. 1-6.

Mammosser et al., "Designing a set of efficient regenerative braking strategies with a performance index tool", Journal of Automobile Engineering, 2014, pp. 1-11.

Suntharalingam et al., "Effect on regenerative braking efficiency with deceleration demand and terrain condition", pp. 1-6.

Wang et al., "Regenerative braking strategy for hybrid electric vehicles based on regenerative torque optimization control", Proc. IMechE. Journal of Automobile Engineering, 2008, vol. 222, pp. 499-513.

Yeo et al., "Regenerative braking algorithm for a HEV with CVT ratio control during Deceleration", Automobile Engineering, 2006, pp. 1-7.

Yoong et al., "Studies of regenerative braking in electric vehicle", IEEE conference on sustainable utilisation and development in engineering and technology, 2010, pp. 40-45.

Zhang, "The control strategy of optimal brake energy recovery for a parallel hydraulic hybrid vehicle", Proc IMechE Part D: J Automobile Engineering, 2012, vol. 226(11), pp. 1445-1453.

Petersen, "Wheel Slip Control in ABS Brakes using Gain Scheduled Optimal Control with Constraints", Department of Engineering Cybernetic Norwegian University of Science and Technology Trondheim, Norway, 2003, 174 pages.

Tehrani et al., "Hybrid energy storage system application for an anti-lock regenerative braking system", European electric vehicle congress, 2011, pp. 1-7.

(56) References Cited

OTHER PUBLICATIONS

Mammosser et al., "Simulation of regenerative braking strategies on slippery roads for a 3-wheel hybrid vehicle", EEVC Brussels, 2012, pp. 1-9.

* cited by examiner

REGENERATIVE BRAKING SYSTEM AND METHOD

CROSS-REFERENCE

The present application claims priority to U.S. Provisional Patent Application No. 62/181,156, filed Jun. 17, 2015, the entirety of which is incorporated herein by reference.

TECHNICAL FIELD

The present technology relates to regenerative braking systems and methods for vehicles having a generator.

BACKGROUND

An electric wheeled vehicle is a vehicle in which the wheels are only driven by an electric motor. Electric vehicles do not emit pollutants, but tend to have a more limited range than vehicles powered by an internal combustion engine (ICE).

Hybrid vehicles are typically powered by both an internal combustion engine (ICE) and an electric motor. Hybrid vehicles provide a longer operating range than purely electric vehicles while emitting fewer pollutants than purely ICE powered vehicles.

In what is commonly known as a series hybrid vehicle, the ICE is used to turn a generator. The generator produces electricity that is used to power the electric motor and/or charge the batteries. The electric motor drives the transmission, which in turn drives the wheels. As such, in a series hybrid vehicle, the ICE is only used to produce electricity.

Another type of hybrid vehicle is what is commonly known as a parallel hybrid vehicle. Typically, in this type of hybrid vehicle, both the ICE and the electric motor drive the wheels. Depending on the operating condition, only the electric motor can drive the wheels, only the ICE can drive the wheels, or both the ICE and the electric motor can drive the wheels together.

Many vehicles that are provided with an electric motor and/or a generator are capable of regenerative braking. Regenerative braking is an energy recovery mechanism which slows a vehicle by converting its kinetic energy to another usable form. In hybrid and electric vehicles, this recovered energy is typically stored within a battery or capacitor by using the vehicle's electric motor as a generator to charge the batteries.

The efficiency of a given regenerative braking system can vary as a function of a number of parameters such as: braking torque, electric motor speed, vehicle speed, and state of charge. In order to maximize energy recuperation, a control unit sets the braking (negative) torque applied by the electric motor during regenerative braking, thereby controlling the rate at which the battery is charged and the rate at which the vehicle decelerates as a result of the braking torque.

An "optimal" braking torque is defined as a braking torque that maximizes energy recovery. This optimal torque, estimated by the control, is typically calculated as a function of vehicle speed. This optimal torque can be used in the two modes described below.

In an automatic mode, the user's input is limited to an instruction to decelerate and the control unit controls the rate of deceleration (in order to maximize regeneration) by setting the braking torque to the calculated optimal torque at each moment during braking.

In a manual mode, the user controls the braking torque (via a brake lever or brake pedal) while information is displayed as to the efficiency of their braking. If desired, the user can adjust their braking request accordingly by increasing or decreasing the braking request to approach the optimal braking torque. This also serves to teach the user to brake efficiently.

Conventional regenerative control systems typically set braking torque ($T_b$) as a function of vehicle speed (v) via a map $K_T$ obtained experimentally or from a function $T_b = K_T(v)$. There are at least two inconveniences with this system.

The first inconvenience is that the map $K_T$ is obtained for a specific set of operating conditions, such as mass of driver, passenger and baggage; distribution of those weights; road condition (clean with good grip, slippery, bumpy, etc.); environment (head/tail wind); slope of road (uphill/downhill). For example, a conventional map $K_T$ may be calibrated for a driver of average mass travelling on flat, dry asphalt with no wind. It is possible to provide multiple maps for different sets of conditions, but it would be prohibitively expensive to provide both the sensors for sensing all these factors and the maps for all possible combinations of those factors. Consequently, the "optimal" torque obtained by the function $K_T(v)$ will not be optimal when conditions vary from those assumed by the function $K_T(v)$.

The second inconvenience is that variations in these parameters can greatly reduce the critical slip (or critical slip ratio). Slip occurs when the surface of a wheel and the road with which it is in contact are not moving at the same speed. The relative movement between the road surface and the wheel's contact patch, expressed as a percentage, is referred to as a "slip ratio", commonly referred to simply as "slip". When braking, a certain amount of slip is normal and even desirable, as it increases the frictional coefficient of the wheel and hence the deceleration. As slip increases from 0% (i.e. no relative movement between the road surface and the contact patch) to a threshold referred to as critical slip, the traction between the wheel and the road will increase. As slip increases beyond the critical slip, which can be between 10% to 15%, traction will decrease. In practice, a vehicle that reaches and crosses the critical slip threshold during a braking event will very rapidly reach 100% slip, i.e. "wheel lock", unless braking is interrupted by, for example, an anti-lock braking system (ABS). If the optimal braking torque $T_b$ is calibrated assuming a flat, dry asphalt road, but the vehicle is actually travelling downhill, on wet gravel for example, then the output braking torque $T_b$ will be too high, resulting in greater slip and a less efficient regenerative braking compared to what would be obtained under the assumed operating conditions. Moreover, the critical slip on an inclined, wet gravel road will be significantly lower than on the flat, dry asphalt road. As such, the larger than optimal slip which results from the output braking torque $T_b$ may bring the vehicle much closer (or even beyond) its critical slip.

Regardless of whether it is the control unit that sets the braking torque $T_b$ or it is the driver that sets it to the braking torque $T_b$ themselves under guidance from the control unit, setting the braking torque $T_b$ too high is detrimental both to regen efficiency and potentially to safety.

To address the issue of wheel lock, conventional regenerative braking control systems typically rely on ABS. The ABS monitors the rotational speed of each wheel in order to detect wheel slip and intervenes by slowing that wheel (or wheels), thereby reducing slip, before wheel lock-up occurs. U.S. Pat. No. 5,654,887, for example, describes a regenerative braking system that attempts to maximize braking torque by using the ABS to keep the vehicle at the point of critical slip. However, it has been shown that when you factor in both mechanical and electrical losses (aerodynamic forces, rolling resistance, etc.; the efficiency of the electrical system including the motor and batteries), maximizing braking torque does not necessarily maximize the energy recapture. In addition, the ABS typically uses mechanical braking (calipers, brake discs or drums), so any intervention therefrom results in wasted (non-regenerated) energy. Moreover, this approach brings the vehicle closer to instability (wheel lock).

Therefore, there is a desire for a regenerative braking system and method that provides efficient regenerative braking while being less sensitive to changes in the operating conditions of the vehicle.

SUMMARY

It is an object of the present technology to ameliorate at least some of the inconveniences present in the prior art.

According to one aspect of the present technology, there is provided a method for recovering energy during braking of a vehicle. The vehicle has at least one rotatable ground engaging member, a generator operatively connected to the at least one rotatable ground engaging member, and at least one energy storage device coupled to the generator. The method comprises: determining a speed of the vehicle; determining a desired slip of the at least one rotatable ground engaging member based at least in part on the speed of the vehicle; and applying a braking torque to the at least one rotatable ground engaging member using the generator based at least in part on the desired slip.

According to some implementations of the present technology, the method further comprises: determining a speed of rotation of the at least one rotatable ground engaging member; determining an actual slip of the at least one rotatable ground engaging member based at least in part on the speed of the vehicle and the speed of rotation of the at least one rotatable ground engaging member; and adjusting the braking torque based at least in part on a difference between the desired slip and the actual slip. According to some implementations of the present technology, the method further comprising receiving a braking command. The braking torque is applied in response to the braking command being received. The braking command is generated in response to a least one of: a braking actuator being actuated; and an accelerator being released.

According to some implementations of the present technology, the braking command is generated in response to the braking actuator being actuated. The braking actuator has a first position where the braking actuator is not actuated and a second position where the braking actuator is actuated. The braking torque is applied and adjusted when the braking actuator is in the second position.

According to some implementations of the present technology, the method further comprises determining a position of the braking actuator. The braking command is generated in response to the braking actuator being actuated. The braking torque is applied based at least in part on the position of the braking actuator.

According to some implementations of the present technology, the method further comprises displaying to a driver of the vehicle a graphical representation of a braking performance based at least in part on a difference between the actual slip and the desired slip.

According to some implementations of the present technology, the at least one energy storage device is at least one battery. The method further comprises storing electrical energy generated by the generator in the at least one battery as chemical energy.

According to some implementations of the present technology, the generator is a motor-generator having a motor mode and a generator mode. The motor-generator applies a propulsive torque to the at least one rotatable ground engaging member when in the motor mode. The motor-generator applies the braking torque to the at least one rotatable ground engaging member when in the generator mode. The method further comprises: receiving a braking command; and switching from the motor mode to the generator mode in response to the braking command being received.

According to some implementations of the present technology, the vehicle also has an internal combustion engine selectively operatively connected to the at least one rotatable ground engaging member. The method further comprises disengaging the engine from the at least one rotatable ground engaging member in response to the braking command being received.

According to some implementations of the present technology, the at least one rotatable ground engaging member is at least one driving wheel of the vehicle. The vehicle also has at least one non-driving wheel. Determining a speed of the vehicle includes determining a speed of rotation of the at least one non-driving wheel.

According to some implementations of the present technology, the desired slip is less than a critical slip of the at least one rotatable ground engaging member.

According to another aspect of the present technology, there is provided a regenerative braking system for a vehicle having a generator adapted to be operatively connected to at least one rotatable ground engaging member of the vehicle; at least one energy storage device coupled to the generator; a control unit connected to the generator for controlling an operation of the generator; and a vehicle speed sensor connected to the control unit to send a signal representative of a speed of the vehicle to the control unit. The control unit has a permanent storage medium including machine-readable instructions causing, when executed, the control unit to: determine a desired slip of the at least one rotatable ground engaging member based at least in part on the speed of the vehicle; and control the generator to apply a braking torque to the at least one rotatable ground engaging member based at least in part on the desired slip.

According to some implementations of the present technology, the system also has a wheel speed sensor connected to the control unit to send a signal representative of a speed of rotation of the at least one rotatable ground engaging member. The machine-readable instructions further cause, when executed, the control unit to: determine an actual slip of the at least one rotatable ground engaging member based at least in part on the speed of the vehicle and the speed of rotation of the at least one rotatable ground engaging member; and control the generator to adjust the braking torque based at least in part on a difference between the desired slip and the actual slip.

According to some implementations of the present technology, the control unit controls the generator to apply the braking torque in response to a braking command being received by the control unit. The braking command is generated in response to a least one of: a braking actuator of the vehicle being actuated; and an accelerator of the vehicle being released.

According to some implementations of the present technology, the braking command is generated in response to the braking actuator being actuated. The braking actuator has a first position where the braking actuator is not actuated and a second position where the braking actuator is actuated. The control unit controls the generator to apply and adjust the braking torque when the braking actuator is in the second position.

According to some implementations of the present technology, the machine-readable instructions further cause, when executed, the control unit to determine a position of the braking actuator based on a signal received from a braking actuator position sensor. The braking command is generated in response to the braking actuator being actuated. The control unit controls the generator to apply the braking torque at least in part on the position of the braking actuator.

According to some implementations of the present technology, the at least one energy storage device is at least one battery. Electrical energy generated by the generator is stored in the at least one battery as chemical energy.

According to some implementations of the present technology, the generator is a motor-generator having a motor mode and a generator mode. The motor-generator is adapted to apply a propulsive torque to the at least one rotatable ground engaging member when in the motor mode. The motor-generator is adapted to apply the braking torque to the at least one rotatable ground engaging member when in the generator mode. The machine-readable instructions further cause, when executed, the control unit to switch the motor-generator from the motor mode to the generator mode in response to a braking command being received.

According to some implementations of the present technology, the vehicle also has an internal combustion engine selectively operatively connected to the at least one rotatable ground engaging member. The machine-readable instructions further cause, when executed, the control unit to send a signal to a clutch actuator to disengage the engine from the at least one rotatable ground engaging member in response to the braking command being received.

According to some implementations of the present technology, the at least one rotatable ground engaging member is at least one driving wheel of the vehicle. The vehicle also has at least one non-driving wheel. The vehicle speed sensor is a wheel speed sensor connected to the control unit to send a signal representative of a speed of rotation of the at least one non-driving wheel to the control unit.

According to some implementations of the present technology, the desired slip is less than a critical slip of the at least one rotatable ground engaging member.

According to another aspect of the present technology, there is provided a vehicle having a frame, at least one rotatable ground engaging member operatively connected to the frame, a generator operatively connected to the at least one rotatable ground engaging member of the vehicle, at least one energy storage device coupled to the generator, a control unit connected to the generator for controlling an operation of the generator, and a vehicle speed sensor connected to the control unit to send a signal representative of a speed of the vehicle to the control unit. The control unit has a permanent storage medium including machine-readable instructions causing, when executed, the control unit to: determine a desired slip of the at least one rotatable ground engaging member based at least in part on the speed of the vehicle; and control the generator to apply a braking torque to the at least one rotatable ground engaging member based at least in part on the desired slip.

According to some implementations of the present technology, a wheel speed sensor is connected to the control unit to send a signal representative of a speed of rotation of the at least one rotatable ground engaging member. The machine-readable instructions further cause, when executed, the control unit to: determine an actual slip of the at least one rotatable ground engaging member based at least in part on the speed of the vehicle and the speed of rotation of the at least one rotatable ground engaging member; and control the generator to adjust the braking torque based at least in part on a difference between the desired slip and the actual slip.

According to some implementations of the present technology, a braking actuator is operatively connected to the frame, and an accelerator is operatively connected to the frame. The control unit controls the generator to apply the braking torque in response to a braking command being received by the control unit. The braking command is generated in response to a least one of: the braking actuator being actuated; and the accelerator being released.

According to some implementations of the present technology, the braking command is generated in response to the braking actuator being actuated. The braking actuator has a first position where the braking actuator is not actuated and a second position where the braking actuator is actuated. The control unit controls the generator to apply and adjust the braking torque when the braking actuator is in the second position.

According to some implementations of the present technology, a braking actuator position sensor is connected to the control unit to send a signal representative of a position of the braking actuator to the control unit. The machine-readable instructions further cause, when executed, the control unit to determine the position of the braking actuator based on the signal received from the braking actuator position sensor. The braking command is generated in response to the braking actuator being actuated. The control unit controls the generator to apply the braking torque at least in part on the position of the braking actuator.

According to some implementations of the present technology, the at least one energy storage device is at least one battery. Electrical energy generated by the generator is stored in the at least one battery as chemical energy.

According to some implementations of the present technology, the generator is a motor-generator having a motor mode and a generator mode. The motor-generator is adapted to apply a propulsive torque to the at least one rotatable ground engaging member when in the motor mode. The motor-generator is adapted to apply the braking torque to the at least one rotatable ground engaging member when in the generator mode. The machine-readable instructions further cause, when executed, the control unit to switch the motor-generator from the motor mode to the generator mode in response to a braking command being received.

According to some implementations of the present technology, the vehicle also has an internal combustion engine selectively operatively connected to the at least one rotatable ground engaging member, a clutch selectively connecting the internal combustion engine to the at least one rotatable ground engaging member, and a clutch actuator operatively connected to the clutch for engaging and disengaging the clutch. The machine-readable instructions further cause, when executed, the control unit to send a signal to the clutch actuator to disengage the clutch to disengage the engine from the at least one rotatable ground engaging member in response to the braking command being received.

According to some implementations of the present technology, the at least one rotatable ground engaging member is at least one driving wheel of the vehicle. The vehicle also has at least one non-driving wheel operatively connected to the frame. The vehicle speed sensor is a wheel speed sensor connected to the control unit to send a signal representative of a speed of rotation of the at least one non-driving wheel to the control unit.

According to some implementations of the present technology, the desired slip is less than a critical slip of the at least one rotatable ground engaging member.

According to another aspect of the present technology, there is provided a regenerative braking system for a vehicle having a generator adapted to be operatively connected to at least one rotatable ground engaging member of the vehicle, at least one energy storage device coupled to the generator, a control unit connected to the generator for controlling an operation of the generator, a display connected to the control unit, a braking actuator position sensor connected to the control unit to send a signal representative of a position of a braking actuator of the vehicle, a vehicle speed sensor connected to the control unit to send a signal representative of a speed of the vehicle to the control unit, and a rotatable ground engaging member speed sensor connected to the control unit to send a signal representative of a speed of rotation of the at least one rotatable ground engaging member. The control unit has a permanent storage medium including machine-readable instructions causing, when executed, the control unit to: determine a desired slip of the at least one rotatable ground engaging member based at least in part on the speed of the vehicle; control the generator to apply a braking torque to the at least one rotatable ground engaging member based at least in part on the position of the braking actuator; determine an actual slip of the at least one rotatable ground engaging member based at least in part on the speed of the vehicle and the speed of rotation of the at least one rotatable ground engaging member; and send instructions to the display device to display to a driver of the vehicle a graphical representation of a braking performance based at least in part on a difference between the actual slip and the desired slip.

According to some implementations of the present technology, the at least one energy storage device is at least one battery. Electrical energy generated by the generator is stored in the at least one battery as chemical energy.

According to some implementations of the present technology, the generator is a motor-generator having a motor mode and a generator mode. The motor-generator is adapted to apply a propulsive torque to the at least one rotatable ground engaging member when in the motor mode. The motor-generator is adapted to apply the braking torque to the at least one rotatable ground engaging member when in the generator mode. The machine-readable instructions further cause, when executed, the control unit to switch the motor-generator from the motor mode to the generator mode in response to the braking actuator being actuated.

According to some implementations of the present technology, the vehicle also has an internal combustion engine selectively operatively connected to the at least one rotatable ground engaging member. The machine-readable instructions further cause, when executed, the control unit to send a signal to a clutch actuator to disengage the engine from the at least one rotatable ground engaging member in response to the braking actuator being actuated.

According to some implementations of the present technology, the at least one rotatable ground engaging member is at least one driving wheel of the vehicle. The vehicle also has at least one non-driving wheel. The vehicle speed sensor is a wheel speed sensor connected to the control unit to send a signal representative of a speed of rotation of the at least one non-driving wheel to the control unit.

According to some implementations of the present technology, the desired slip is less than a critical slip of the at least one rotatable ground engaging member.

According to some implementations of the present technology, the graphical representation of the braking performance indicates if the actual slip is higher or lower than the desired slip.

According to another aspect of the present technology, there is provided a vehicle having a frame, the regenerative braking system according to any one of the above implementations of the present technology, and the at least one rotatable ground engaging member operatively connected to the frame.

According to some implementations of the present technology, a handlebar is connected to the frame for steering the vehicle. The braking actuator is mounted to the handlebar.

For purposes of this application terms related to spatial orientation such as forward, rearward, left, and right, are as they would normally be understood by a driver of the vehicle sitting thereon in a normal driving position.

Exemplary implementations of the present technology have at least one of the above-mentioned aspects, but do not necessarily have all of them. It should be understood that exemplary implementations of the present technology may have other aspects not specifically recited herein.

Additional and/or alternative features, aspects, and advantages of implementations of the present technology will become apparent from the following description, the accompanying drawings, and the appended claims.

BRIEF DESCRIPTION OF THE DRAWINGS

For a better understanding of the present technology, as well as other aspects and further features thereof, reference is made to the following description which is to be used in conjunction with the accompanying drawings, where.

DETAILED DESCRIPTION

The present technology will be described with respect to a hybrid three-wheel vehicle having a handlebar for steering. However it is contemplated that aspects of the present technology could be used in a vehicle powered only by an electrical motor or in a vehicle powered by means other than an electrical motor, but provided with a separate electrical generator. It should also be understood that aspects of the present technology could be used in other wheeled vehicles such as, but not limited to, a motorcycle, a scooter, and an all-terrain vehicle (ATV). It is also contemplated that aspects of the present technology could be used on vehicles having at least one rotatable ground engaging member other than a wheel. For example, aspects of the present technology could be used on a vehicle having at least one rotatable ground engaging member that is an endless track.

Figure 1:
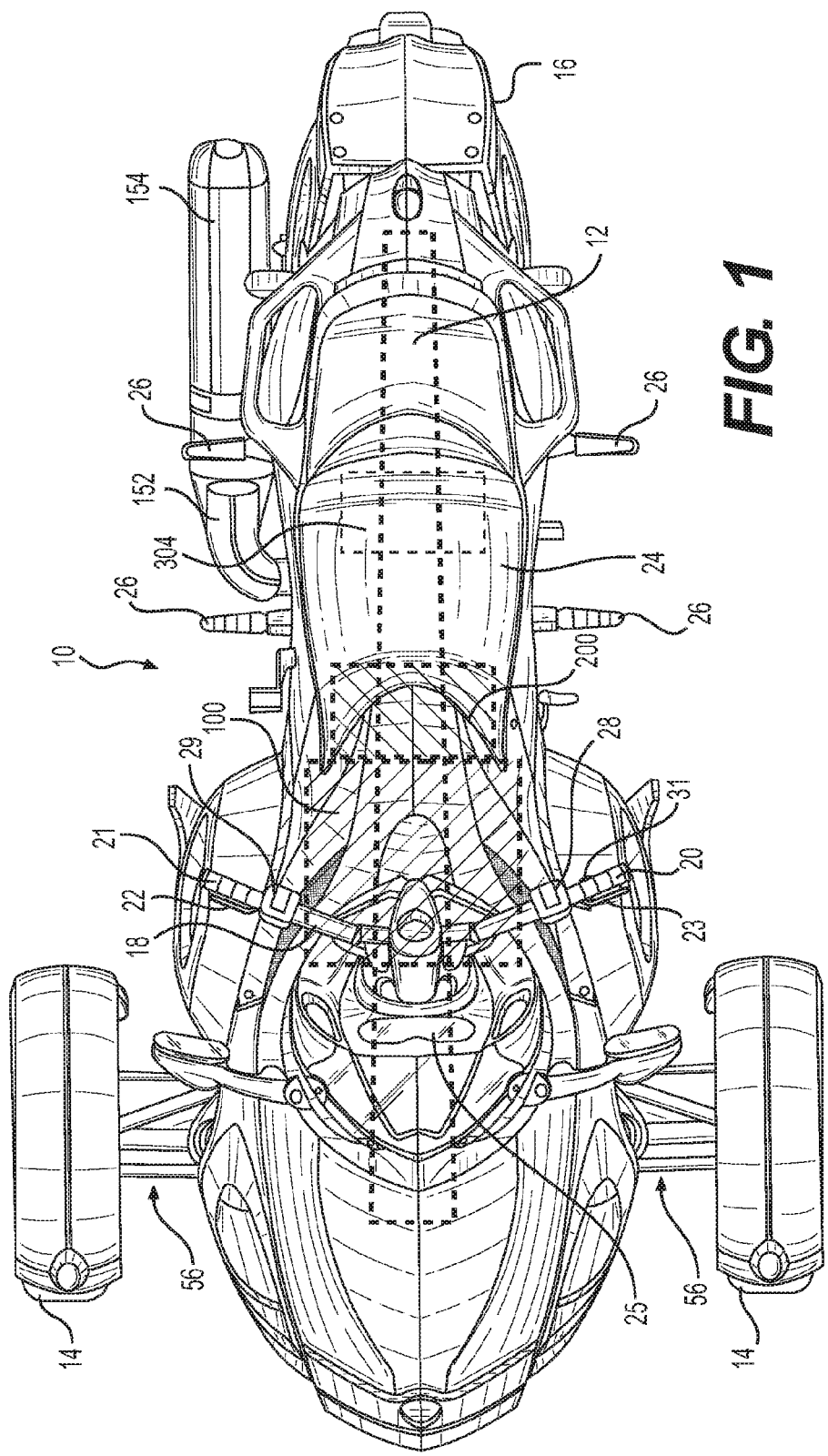
FIG. 1 is a top plan view of a three-wheel vehicle.

Referring to FIG. 1, a three-wheel vehicle 10 has a frame 12 (shown schematically in this figure) to which two front wheels 14 and one rear wheel 16 are connected. All of the wheels 14, 16 are provided with mechanical brakes (not shown). In some implementation, the mechanical brakes are provided with electronic brake actuators such that the mechanical brakes can be applied in response to an electronic signal, as in an anti-lock braking system. A handlebar 18 is connected to the two front wheels 14 for steering the two front wheels 14. The handlebar 18 has a left handle 20 and a right handle 21 disposed at the ends of the handlebar 18. An accelerator 22, in the form of a throttle lever, is provided on the right handle 22 to allow the driver to control a speed and acceleration of the vehicle 10. It is contemplated that the accelerator 22 could alternatively be a twist grip or a pedal or any other suitable actuator. The accelerator 22 is normally biased toward an idle position. As such, when a driver of the vehicle 10 releases the accelerator 22, the accelerator 22 returns to this idle position. A braking actuator 23, in the form of a brake lever, is provided on the left handle 20 to allow the driver to control a braking of the vehicle 10. It is contemplated that the braking actuator 23 could be a brake pedal or any other suitable actuator. The handlebar 18 is disposed forward of a straddle seat 24 that is supported by the frame 12. A display device 25 is provided forward of the handlebar 18 to provide information to the driver of the vehicle 10, such as, for example, the performance of the regenerative braking as discussed below. An internal combustion engine 100, a transmission 200 and an electric motor 300 (shown schematically in FIG. 2) are disposed on the frame 12 as will be described in greater detail below. Footrests 26 are mounted on the left and right sides of the vehicle 10 below the straddle seat 24.

A drive selector switch 28 is mounted on the left side of the handlebar 18. The drive selector switch 28 is used to select if the vehicle 10 is to be driven forward, rearward or be in neutral. The shift position (i.e. first gear, second gear . . . ) of the transmission 200 is automatically selected and changed by a control module 150 (FIG. 5) based on the selection made with the switch 28 and other operating conditions of the vehicle 10 such as vehicle speed and accelerator position. It is contemplated that the drive selector switch 28 could alternatively be a finger-operated button, a hand actuated lever, a foot actuated pedal or any other suitable type of selector. It is contemplated that the drive selector switch 28 could be used by the user to select a shift position of the transmission 200. An operation mode selector switch 29 is mounted on the right side of the handlebar 18. The operation mode selector switch 29 is used by the driver to select a mode of operation of the vehicle such as the ELECTRIC mode, ECO mode, CHARGE mode, and SPORT mode described below. It is contemplated that the switches 28 and 29 could be positioned elsewhere on the vehicle 10. A regenerative braking button 31 is provided on the left side of the handlebar 18 to initiate an automatic mode of regenerative braking as will be explained below. It is contemplated that the regenerative braking button 31 could be omitted if the vehicle 10 is not provided with an automatic regenerative braking mode (i.e. it is only provided with a manual mode, discussed below) or if the function of the button 31 is achieved by the braking actuator 23.

The three-wheel vehicle 10 has other features well known in the art such as a vehicle body, rear view mirrors, lights and mudguards. For simplicity, these features will not be described in detail herein.

Figure 2:
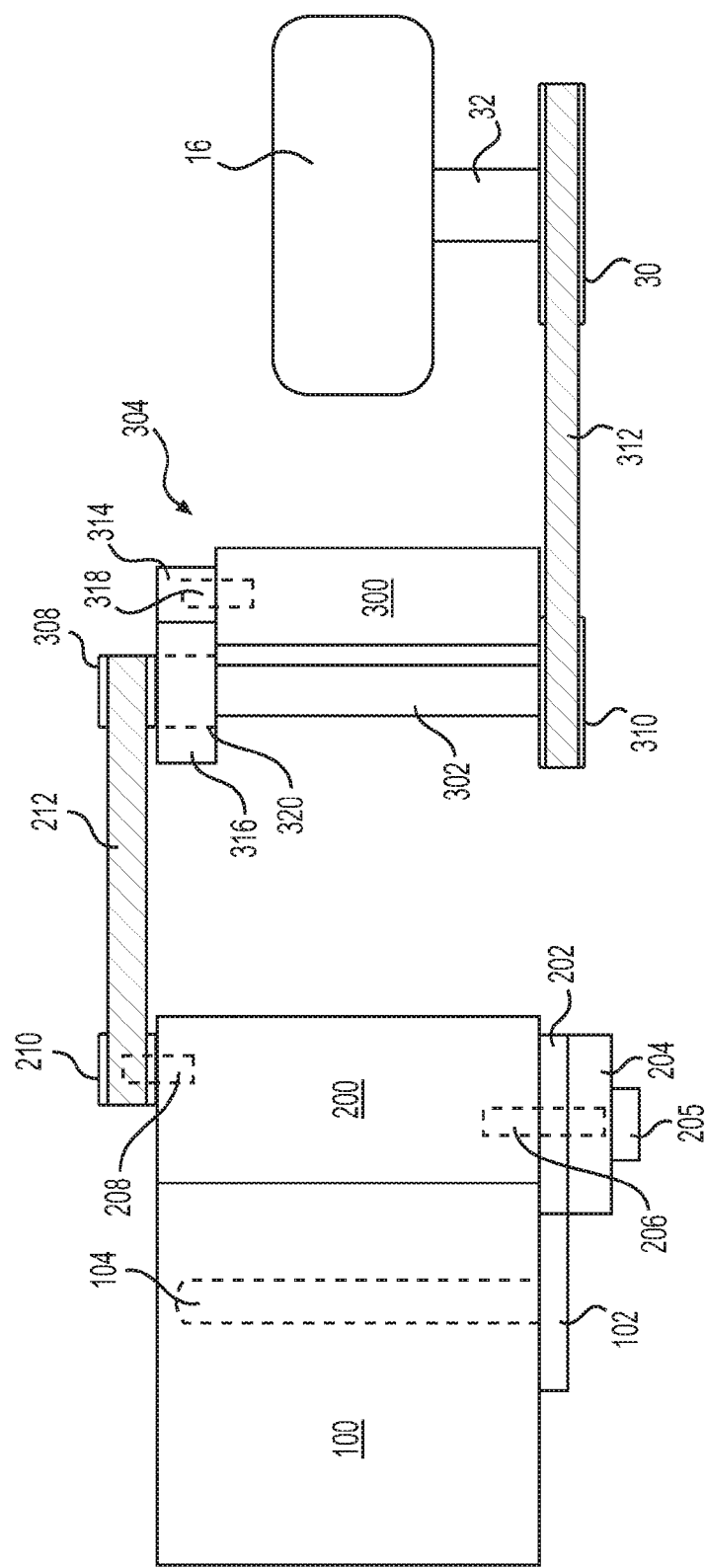
FIG. 2 is a schematic top view of a drivetrain of the three-wheel vehicle of FIG. 1.

Turning now to FIG. 2, a drivetrain of the three-wheel vehicle 10 will be described. The drivetrain includes the engine 100, the transmission 200, the electric motor 300, a torque transmission shaft 302 and other components described below. The engine 100 is a four-stroke, two-cylinder in line internal combustion engine. It is contemplated that the engine 100 could be another type of internal combustion engine such as, but not limited to, a two-stroke, V-type internal combustion engine. The transmission 200 is mounted to the back of the engine 100. The transmission 200 is an automated six-speed electrohydraulic sequential transmission. It is contemplated that the transmission 200 could have more or fewer speeds. It is contemplated that other types of transmissions, such as a manual transmission or a continuously variable transmission, could alternatively be provided. The torque transmission shaft 302 and the electric motor 300 form an assembly 304 that is disposed rearward of the engine 100 and transmission 200. The electric motor 300 is a synchronous alternating current electric motor. It is contemplated that other types of electric motors could be used. The electric motor 300 is a motor-generator which can operate in a motor mode to propel the vehicle or in a generator mode to generate electricity. For simplicity, the motor-generator 300 will be referred to herein simply as the electric motor 300. It is contemplated that instead of having the combination motor-generator 300, the vehicle 10 could be provided with an electric motor providing only the motor mode function of the motor-generator 300 and a separate electrical generator providing only the generator function of the motor-generator 300. The electric motor 300 is powered by a high voltage battery 306 (FIG. 3) that stores energy as chemical energy. In one implementation, the battery 306 has a voltage of 374 volts. In other implementations, the voltage of the battery 306 is between 168 and 252 volts. Other voltages are contemplated. The battery 306 is provided with a cooling system (not shown) to prevent overheating of the battery 306. It is also contemplated that the electric motor 300 could be powered by more than one battery 306. It is also contemplated one or more energy storage devices other than a battery could be used instead of or in addition to the battery 306. For example, it is contemplated that an energy storage device such as a supercapacitor could be used in combination with the battery 306.

The engine 100 selectively drives the transmission 200 via a drive gear 102 disposed on a left end of a crankshaft 104 of the engine 100. The drive gear 102 engages a clutch drive gear 202 of a clutch 204 that is mounted on an input shaft 206 of the transmission 200. The clutch 204 is a normally opened electrohydraulic automatic clutch. The clutch 204 is connected to and controlled by a clutch actuator 205, which is itself controlled by a control unit 150. The clutch 204 selectively transmits torque from the drive gear 102 to the input shaft 206. The input shaft 206 transmits torque to an output shaft 208 of the transmission 200, and vice versa, via gears. A dampened belt sprocket 210 is disposed on a right end of the output shaft 208. The dampened belt sprocket 210 is of the type described in United States Patent Publication No. US2008/0283322 A1, published Nov. 20, 2008, the entirety of which is incorporated herein by reference. It is contemplated that other types of dampened or undampened belt sprockets could be used. A toothed belt 212 is disposed around both the belt sprocket 210 and a belt sprocket 308 disposed on a right end of the torque transmission shaft 302. The belt 212 transmits torque from the output shaft 208 of the transmission 200 to the torque transmission shaft 302, and vice versa. Another belt sprocket 310 is disposed on a left end of the torque transmission shaft 302. The belt sprockets 308 and 310 are undampened, but it is contemplated that they could be. A toothed belt 312 is disposed around both the belt sprocket 310 and a dampened belt sprocket 30 disposed on a left end of a wheel shaft 32 of the rear wheel 16 to drive the rear wheel 16. The belt sprocket 30 is also of the type described in United States Patent Publication No. US2008/0283322 A1, but it is contemplated that other types of dampened or undampened belt sprockets could be used. It is contemplated that the toothed belt 212 and/or the toothed belt 312 could be replaced by a chain, in which case the corresponding belt sprockets 210, 308, 310, 30 would be replaced by chain sprockets.

The electric motor 300 drives the torque transmission shaft 302 via gears 314 and 316. The gear 314 is disposed on a right end of a shaft 318 of the electric motor 300. The gear 316 is disposed on a right side of the torque transmission shaft 302, laterally inwardly of the belt sprocket 308. Torque from the electric motor 300 is then transmitted to the rear wheel 16 by the belt sprockets 310 and 30 and the belt 312 as described above. The gear 316 is mounted on the torque transmission shaft 302 by a friction clutch 320 disposed radially between the torque transmission shaft 302 and the gear 316. As will be described in greater detail below, under certain operating conditions, it is the torque transmission shaft 302 that drives the electric motor 300 via the gears 314, 316. Under such operating conditions, the electric motor 300 generates electricity thereby recharging the battery 306.

As will be explained in greater detail below, the rear wheel 16 can be driven by the electric motor 300 only, by the internal combustion engine 100 only, or by both the electric motor 300 and the internal combustion engine 100.

It is contemplated that the engine 100 and transmission 200 could be omitted such that the vehicle 10 is only driven by the electric motor 300 via the belt sprockets 310 and 30 and the belt 312.

Figure 3:
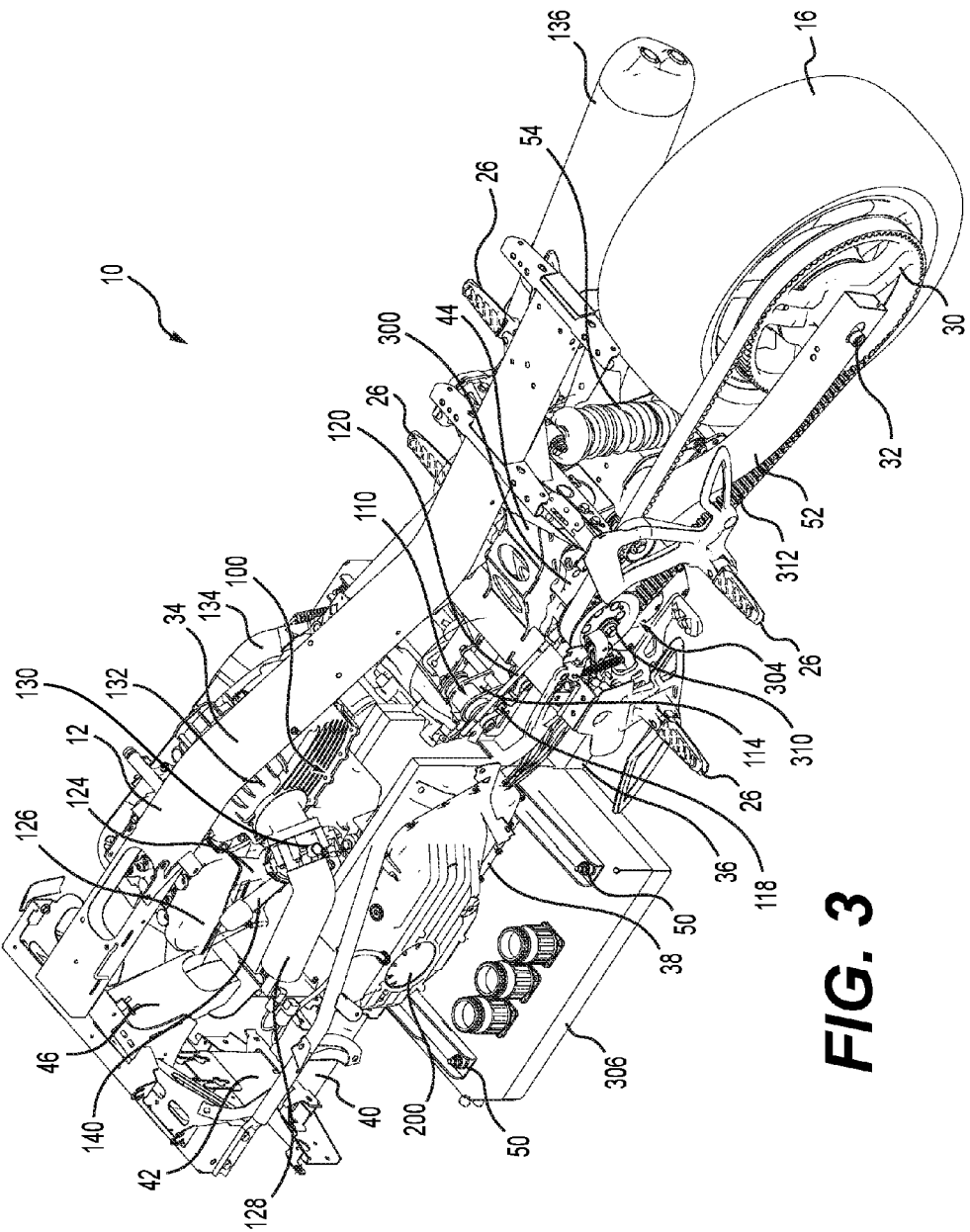
FIG. 3 is perspective view taken from a rear, left side of a frame of the three-wheel vehicle of FIG. 1 and of some of the components connected thereto.
Figure 4:
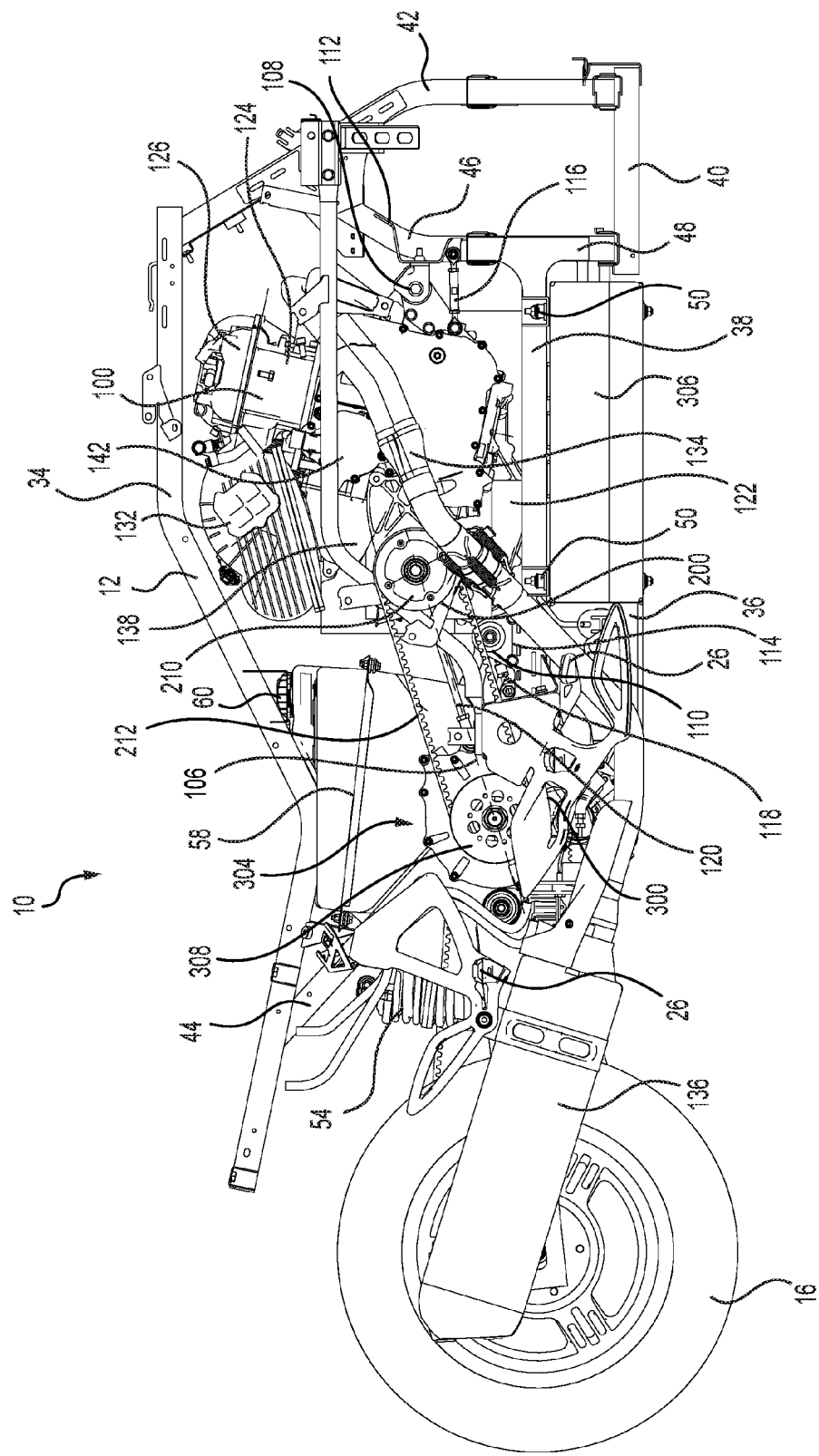
FIG. 4 is a right side elevation view of the frame of the three-wheel vehicle of FIG. 1 and of some of the components connected thereto.

Turning now to FIGS. 3 and 4, the frame 12 and the arrangement of the drivetrain and other components of the vehicle 10 on the frame 12 will be described in more details.

The frame 12 is similar to the frame described in International Patent Publication No. WO2007/130015 A1, published on Nov. 15, 2007, the entirety of which is incorporated herein by reference. The main difference between the frame 12 and the frame of the above-recited International Patent Publication is the presence of a recess formed in the lower portion of the frame 12 to receive the battery 306, as will be described below.

The frame 12 has an upper frame member 34, a rear lower frame member 36, a center lower frame member 38 and a front lower frame member 40 which are interconnected with each other, thus forming a closed perimeter with a space therein. A forward cross member 42 interconnects a forward portion of the upper frame member 34 with a forward portion of the front lower frame member 40. A rearward cross member 44 interconnects a rearward portion of the upper frame member 34 with a rearward portion of the rear lower frame member 36. A strut 46 extends from the forward cross member 42 to the forward portion of the center lower frame member 38. The center lower frame member 38 is raised relative to the rear and front lower frame members 36 and 40. The center lower frame member 38 has a front leg 48 connecting a front portion thereof to a rearward portion of the front lower frame member 40. The center lower frame member 38 also has a rear leg (not shown) connecting a rear portion thereof to a forward portion of the rear lower frame member 40. The raised center lower frame member 38 creates a space to receive the battery 306. The battery 306 is fastened to brackets 50 extending laterally outwardly from the center lower frame member 38. As can be seen in FIG. 4, a bottom surface of the battery 306 is substantially leveled with the bottom surfaces of the rear and front lower frame members 36 and 40. However it is contemplated that the bottom surface of the battery 306 could be higher or lower than the bottom surfaces of the rear and front lower frame members 36 and 40 depending on the position of the center lower frame member 38 relative to the two other lower frame members 36 or 40. It is also contemplated that the battery 306 could be mounted above one of the lower frame members 36, 38 and 40. In such an implementation, the lower frame members 36, 38 and 40 could be replaced by a single straight lower frame member. It is contemplated that the battery 306 could be located elsewhere on the frame or the vehicle 10 depending on the arrangement of the other components of the vehicle 10.

The upper frame member 34, rear lower frame member 36, center lower frame member 38, front lower frame member 40, forward cross member 42, rearward cross member 44 and strut 46 are made of metallic tubular beams having similarly sized rectangular cross-sections. However it is contemplated that the members 34, 36, 38, 40, 42 and 44 and strut 46 could have different cross-sectional dimensions, could be made of non-metallic material (composite materials for example), and could also have a different configuration (I-beams or C-channels for example). The rear lower frame member 36 and the rearward cross member 44 are integrally formed as a single beam that is bent. It is also contemplated that these members 36, 44 could be welded to each other. The rearward cross member 44 extends rearward and upward from the rear lower frame member 36 and is welded to the upper frame member 34. The upper and lower ends of the forward cross member 42 are welded to the upper frame member 34 and to the front lower frame member 40 respectively. The center lower frame member 38 is welded to the rear and front lower frame members 36, 40. It is contemplated that the members 34, 36, 38, 40, 42 and 44 may be joined by other means. For example, they may be joined by using brackets and fasteners. It is also contemplated that the members 34, 36, 38, 40, 42 and 44 could be made of a single beam, which could be bent to obtain a closed perimeter. The above-described frame 12 is only one contemplated frame for the vehicle 10. It is contemplated that other frames could be used. The frame 12 has a number of other features and brackets, some of which will be described in greater detail below.

The rear wheel 16 is mounted to the frame 12 via a swing arm 52. The length of the swing arm 52 is selected such that at least a portion of the rear wheel 16 is disposed below the rear portion of the upper frame member 34, but it is contemplated that a longer swing arm could be used. A shock absorber unit 54 is mounted to the swing arm 52 at one end and to the rearward cross member 44 at the other, so as to be disposed along a longitudinal centerline of the vehicle 10. The shock absorber unit 54 consists of a hydraulic shock absorber with a coil spring disposed around the shock absorber. The front wheels 14 are mounted to the frame 12 via double A-arm suspensions 56 (FIG. 1) operatively connecting the wheels 14 to the forward cross member 42 and the strut 46. It is contemplated that different types of suspensions could be used to mount the wheels 14, 16 to the frame 12.

A fuel tank 58, shown in FIG. 4, is mounted to the frame 12 via brackets. The fuel tank 58 holds the fuel used by the engine 100 to operate. As can be seen, the fuel tank 58 is disposed rearward of the internal combustion engine 100, vertically above the assembly 304, and between the upper frame member 34 and the rearward cross member 44. In this position, the fuel tank 58 is disposed under the seat 24. The fuel tank 58 can be filled by removing a cap 60 that can be accessed by pivoting or removing the seat 24.

The assembly 304 formed by the torque transmission shaft 302 and the electric motor 300 is disposed rearward of the internal combustion engine 100 and is located under the rearward cross member 44. The assembly 304 defines a channel (not shown) that receives a portion of the rearward cross member 44. Threaded fasteners (not shown) extend through the channel and this portion of the rearward cross member 44 to rigidly mount the assembly 304 under the rearward cross member 44. It is contemplated that the connection between the assembly 304 and the rearward cross member 44 could be provided with dampening means, such as, for example, elastomeric bushings around the fasteners, to reduce the transmission of vibrations between the assembly 304 and the rearward cross member 44. The assembly 304 is located along the rearward cross member 44 such that an axis of rotation of the belt sprocket 310 is in proximity to an axis of rotation of the swing arm 52 relative to the frame 12. In an alternative implementation, the axis of rotation of the belt sprocket 310 and the axis of rotation of the swing arm 52 relative to the frame 12 are coaxial.

The internal combustion engine 100 and the transmission 200 are mounted as a unit over the center lower frame member 38, above the battery 306. Due to the orientation of the engine 100 and the type of crankshaft 104 being used, the engine 100 generates the least vibrations in the direction parallel to the axis 106 (FIG. 4) passing through the centers of the sprockets 210 and 308. To reduce the transmission of vibrations to the frame 12, the engine 100 and transmission 200 are connected to the frame via two front rubber dampers 108 (only one of which is shown in FIG. 4) and one rear rubber damper 110 (FIG. 3). The front rubber dampers 108 are disposed on either side of the front on the engine 100. As can be seen in FIG. 4, the front rubber dampers 108 connect the engine 100 to brackets 112 connected to the strut 46. The rear rubber damper 110 consists of a metal cylinder disposed around a rubber cylinder enclosing a fastener connected to a bracket 114. The bracket 114 connects the rear rubber damper 110 to the center lower frame member 38.

In order to prevent movement of the engine 100 and transmission 200 toward the rear of the vehicle 10, which would cause the belt 212 to lose tension, various elements are provided to restrain such motion. A rod 116 (FIG. 4) having ball joint ends is connected between the front of the engine 100 and the strut 46. The rod 116 extends generally horizontally. Another rod 118 having ball joint ends has one end connected to the fastener of the rear rubber damper 110 and another end connected to a bracket (not shown) connecting the bracket 114 to the center lower frame member 38. Rods 120 have one end connected to the assembly 304. The rods 120 are connected to the assembly 304 via ball joints. The rods extend from the assembly 304 toward the engine 100 and transmission 200. The ends of the rods 120 opposite the ends having the ball joints are slidably received inside recesses (not shown) in the transmission 200. As such, the rods 120 prevent the engine 100 and transmission 200, and therefore the belt sprocket 210 to move toward the belt sprocket 308, which would cause the belt 212 to lose tension, but permit the engine 100 and transmission 200 to move away from the belt sprocket 308. It is contemplated that one or more of the rods 116, 118 and 120 could be omitted.

With reference to FIGS. 3 and 4, the internal combustion engine 100 will be described in more detail. The engine 100 has a crankcase 122, a cylinder block 124 above the crankcase 122, and a cylinder head 126 above the cylinder block 124. The crankshaft 104 extends laterally and is supported by bearings (not shown) in the crankcase 122 for rotation therein. The cylinder block 124 defines two cylinders (not shown) disposed laterally next to each other. Pistons (not shown) are received inside the cylinders for reciprocation therein. The pistons are connected via connecting rods (not shown) to crank pins (not shown) of the crankshaft 104. The pistons, cylinders and cylinder head 124 form two variable volume combustion chambers (not shown).

Two air intake ports (not shown) supply air and fuel inside the combustion chambers. Air is supplied to the air intake ports by an air intake system consisting of a hose 128, a throttle body 130 controlling the flow of air to the air intake ports, an air box/intake manifold 132, and an air filter. Fuel is supplied from the fuel tank 58 to the air intake ports by a fuel supply system (not shown). The fuel supply system includes at least one fuel pump, hoses, and two fuel injectors. Two spark plugs (not shown) inserted in the cylinder head 126 ignite the air/fuel mixture in the cylinders. The exhaust gases generated by the combustion of the air/fuel mixture exit the cylinders by two exhaust ports (not shown). From the exhaust ports, the exhaust gases flow in an exhaust manifold (not shown) mounted on the front of the cylinder block 124. From the exhaust manifold, the exhaust gases flow inside pipes 134 that, as can be seen, extend forward, then laterally toward the right across the front of the engine 100, then rearward and downward along a right side of the engine 100 to a muffler 136. The muffler 136 is disposed at the rear of the vehicle 10 to the right of the rear wheel 16. Fluid communications between the intake ports, the exhaust ports and the combustion chambers are controlled by intake and exhaust valves (not shown) respectively. The intake and exhaust valves are actuated by a camshaft system (not shown).

Oil for lubricating the engine 100 is stored in an oil tank formed between the back walls of the crankcase 122 and of the cylinder block 124 and an oil tank cover 138. The cover 138 is fastened to the back walls of the crankcase 122 and of the cylinder block 124 and is disposed below the air box/intake manifold 132. The oil tank can be filled via an oil filler neck 140. Oil is supplied to the various components of the engine 100 via an oil pump (not shown) driven by the crankshaft 104 and is filtered by an oil filter (not shown). The engine 100 is cooled by water pumped from a water reservoir (not shown) by a mechanical pump (not shown). The mechanical pump is also driven by the crankshaft 104.

A starter motor (not shown) is mounted to the front of the crankcase 122. The starter motor selectively engages the drive gear 102 to cause the initial rotations of the crankshaft 104 necessary to start the engine 100. The starter motor is powered by a 12 volts battery (not shown). This battery also powers the various gauges and displays on the vehicle 10, and the various control units and modules of the vehicle 10. This battery is recharged by a 12 Volts generator (not shown, disposed behind cover 142 in FIG. 4) when the engine 100 is operating or by the battery 306.

Figure 5:
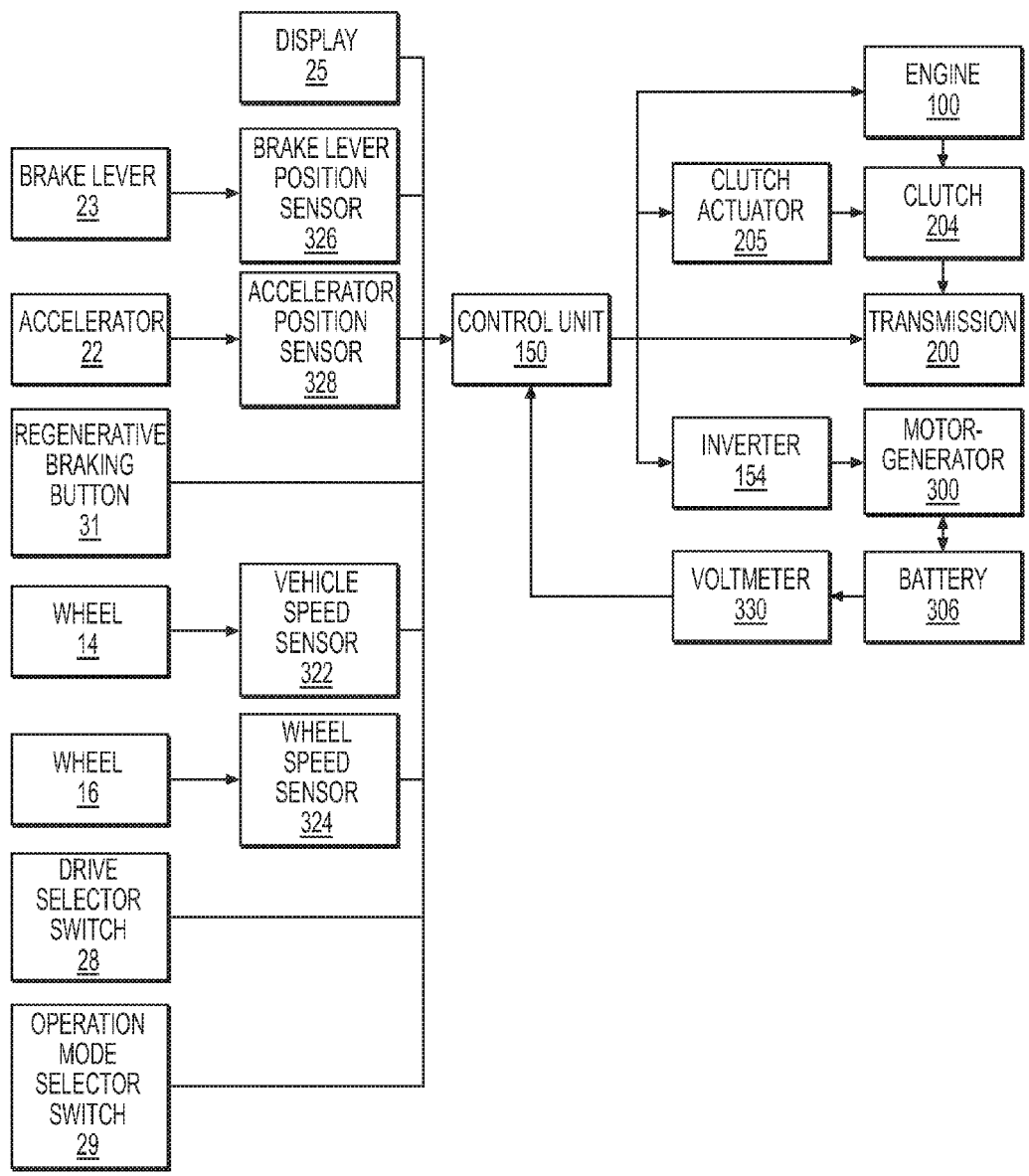
FIG. 5 is a schematic representation of components of the vehicle of FIG. 1 used in propelling the vehicle, providing regenerative braking for the vehicle, and in controlling the vehicle.

The engine 100 is controlled by the control unit 150 (FIG. 5). The control unit 150 controls the throttle opening, the fuel injection, and the ignition timing of the engine 100 according to a torque-based control strategy. The torque to be generated by the engine 100 is determined by the control unit 150 based on various parameters of the vehicle 10 such as, for example, a position of the throttle operator, a speed of the vehicle 10, a speed of the engine 100, a shift position of the transmission 200, and a torque generated by the electric motor 300. The control unit 150 then controls the throttle opening, fuel injection, and ignition timing of the engine 100 to obtain this torque. The control unit 150 includes a permanent storage medium, such as a hard drive or a flash drive for example. The permanent storage medium stores the various control maps and machine readable instructions used to achieve the various control functions of the control unit 150.

The electric motor 300 will now be described in more detail. The electric motor 300 includes a stator and a rotor (not shown). The stator carries an armature winding (not shown). The rotor includes a shaft 318 that carries permanent magnets between rings (not shown). It is contemplated that the permanent magnets could be replaced by field windings. The shaft 318 is rotationally supported inside the electric motor 300 by ball bearings (not shown).

An inverter 154 (FIG. 5) controls the operation of the electric motor 300. To run the electric motor 300, a three-phase alternating current is applied to the armature winding of the stator to generate a rotating magnetic field. The magnetic fields of the permanent magnets cause the rotor to rotate with the magnetic field of the stator, thereby turning the shaft 318. The inverter 154 converts the direct current from the battery 306 to alternating current to be applied to the armature winding. The inverter 154 also controls the frequency of the alternating current applied to the armature winding, thereby controlling the speed of rotation of the shaft 318. The control unit 150 determines a torque to be generated by the electric motor 300 based on various parameters of the vehicle 10 such as, for example, a position of the throttle operator, a speed of the vehicle 10, a speed of the engine 100, a shift position of the transmission 200, and an operation mode of the vehicle 10. The control unit 150 sends a signal representative of this torque to the inverter 154 that then controls the alternating current applied to the armature winding to generate this torque.

Under certain conditions, it is possible to use the electric motor 300 in a generator mode to recharge the battery 306. This is known as regeneration. Under such conditions, the control unit 150 determines a braking torque to be generated by the electric motor 300 based on various parameters of the vehicle 10 as will be described below. The control unit 150 sends a signal representative of this braking torque to the inverter 154 that then controls the alternating current applied to the armature winding to generate this braking torque. The rotation of the shaft 318 causes the magnetic fields of the permanent magnets to induce an alternating current in the armature winding. The inverter 154 converts this alternating current to direct current and supplies it to the battery 306 to recharge it.

The various modes of operation of the drivetrain of the vehicle 10 will now be described. Unless otherwise indicated, the various modes are selected by the driver of the vehicle 10 via the switch 29. The driver can switch mode at any time, including when the vehicle 10 is in motion.

It is contemplated that during at least some of these modes, should the battery 306 be fully charged, a message would be displayed to the driver on the display device 25 that regeneration is no longer possible. The reason for this is that regeneration creates a mechanical load on the drivetrain that tends to decelerate the vehicle 10 known as regenerative braking. As such, when regeneration is no longer possible, the deceleration characteristics of the vehicle 10 are somewhat affected.

It is contemplated that for at least some of these modes, when the driver stops the vehicle 10 on a sloped surface, that the electric motor 300 could be controlled to compensate for the force of gravity acting on the vehicle 10. As a result, the vehicle 10 would stay stationary even if the driver does not apply the brakes.

In the ELECTRIC mode of operation, the vehicle 10 is propelled only by the electric motor 300 operating in the motor mode. As such, when this mode is selected, the control unit 150 causes the clutch actuator 205 to maintain the clutch 204 in an opened position and causes the transmission 200 to be in the neutral position.

When the driver wants the vehicle 10 to move in reverse, as selected by the switch 28, the vehicle 10 is propelled only by the electric motor 300 as in the ELECTRIC mode above, except that the shaft 318 of the electric motor 300 is made to turn in the opposite direction.

In the ECO mode of operation, the vehicle 10 operates as in the ELECTRIC mode described above until the vehicle 10 reaches a predetermined speed. In one exemplary implementation, this speed is 50 km/h. When the predetermined speed is reached, the control unit 150 causes the transmission 200 to be in a shift position corresponding to a shift position that would normally be engaged would the internal combustion engine 100 be miming at the current operating conditions of the vehicle 10. Once this shift position is determined, the control unit 150 causes the transmission 200 to downshift sequentially from the neutral shift to the determined shift position. By downshifting from the neutral position, the sixth shift position is engaged first, thus limiting the initial acceleration of the input shaft 206 compared to initially engaging the first shift position from the neutral shift position. Once the correct shift position is engaged, the control unit 150 actuates a starter motor. The starter motor then rotates the crankshaft 104 via the drive gear 102. The control unit 150 then sends a signal to the clutch actuator 205 to close the clutch 204. As a result, the crankshaft 104 of the engine 100 is driven by the electric motor 300 via the transmission 200, thus permitting the engine 100 to be started. As the starter motor has already caused initial rotations of the crankshaft 104 of the engine 100 when the clutch 204 is closed, the torque required by the electric motor 300 to drive the engine 100 is reduced, thus reducing undesired shocks on the drivetrain of the vehicle 10. It is contemplated that the actuation of the starter motor could be omitted, hence the engine 100 could be started by the electric motor 300 without assistance from the starter motor. It is contemplated that under certain conditions, such as, but not limited to, low traction or low speed conditions, the control unit 150 could actuate the starter motor prior to engaging the correct shift position so as to initiate rotation of the crankshaft 104 of the engine 100 to start the engine 100 and that, once the correct shift position is engaged, the control unit 150 sends a signal to the clutch actuator 205 to close the clutch 204. Once the engine 100 has started, the vehicle 10 can be driven by both the engine 100 and the electric motor 300 or only by the engine 100. When the vehicle 10 is only driven by the engine 100, the electric motor 300 is switched to the generator mode and charges the battery 306 as described above. It is contemplated that the electric motor 300 could also be operated to compensate for the torque variations resulting from the shifting of the transmission 200, thus providing smoother shifting. When the vehicle 10 falls back below the predetermined speed, the clutch 204 is opened, the engine 100 is shut down and the transmission 200 is returned to the neutral shift position. It is contemplated that, after the engine 100 has been started once, the transmission 200 could be returned to a shift position other than the neutral shift position.

In the CHARGE mode of operation, the vehicle 10 generally operates as in the ECO mode, but with a higher priority to recharging the battery 306. When the charge level of the battery 306 is below a predetermined level, the control unit 150 essentially uses only the engine 100 to drive the vehicle 10, and uses the electric motor 300 in the generator mode to charge the battery 306 as described above, regardless of the speed of the vehicle 10. It is contemplated that for high speeds or high acceleration of the vehicle 10, the control unit 150 may use both the engine 100 and the electric motor 300 to drive the vehicle 10. When the predetermined level of charge is reached, the control unit 150 operates the vehicle 10 as in the ECO mode. It is contemplated that this mode of operation could be selected automatically (i.e. without driver intervention) should the state of charge of the battery 306 be low, in which case a message would be displayed to the driver on the display device 25 informing him of the change of mode. It is also contemplated that the vehicle 10 could be provided with a satellite navigation system that would automatically activate the CHARGE mode upon approaching an area in a programmed itinerary where "electric only" propulsion is preferred or mandatory, thus ensuring a full battery charge when this area is reached. It is contemplated that this same system could automatically engage the ELECTRIC mode when such an area is reached.

In the SPORT mode of operation, the vehicle 10 generally operates as in the ECO mode, but with a higher priority to providing the maximum amount of propulsive torque to the wheel 16. The control unit 150 uses both the engine 100 and the electric motor 300 to drive the vehicle 10, and causes the transmission 200 to be in a lower shift position as compared to the ECO mode for the same other conditions, thus providing more available torque for rapid acceleration of the vehicle 10. When the torque required to drive the vehicle 10 is below a predetermined value however, the control unit 150 operates the vehicle 10 as in the ECO mode. For example, the control unit 150 may then use the electric motor 300 to charge the battery 306. The engine 100 can be started as described above with respect to the ECO mode by using the electric motor 300 or by using the starter motor. It is contemplated that torque compensation by the electric motor 300 when shifting the transmission 200 could be omitted, thus providing a sportier feeling.

It is also contemplated that the drivetrain could be provided with a MAINTENANCE mode. This mode can be activated by maintenance personnel using electronic tools interfacing with the control unit 150. In this mode, the engine 100 is started using the starter motor with the clutch 204 opened.

It is also contemplated that the drivetrain could be provided with an ENGINE-ONLY mode. This mode can be activated automatically by the control unit 150 when, for example, the battery 306 is defective. In this mode, the engine 100 is started using the starter motor with the clutch 204 initially opened, and the vehicle 10 is driven by the engine 100 only. To propel the vehicle 10 after starting the engine 100, the control unit 150 causes the clutch actuator 205 to close the clutch 204 so as to engage the transmission 200 smoothly.

Turning now to FIG. 5, additional components of the vehicle 10 will be described. Components of the vehicle 10 that appear in FIG. 5 and which have been described above will not be described again. The vehicle 10 has a vehicle speed sensor 322 used to sense the speed of the vehicle 10 and to send a signal representative of this speed to the control unit 150. In one implementation, the vehicle speed sensor 322 is a wheel speed sensor that senses a speed of rotation of one of the front wheels 14 (i.e. a non-driving wheel), which can be used to determine the speed of the vehicle 10. It is contemplated that the vehicle speed sensor 322 could be another type of sensor such as a global positioning system (GPS). It is contemplated that the control unit 150 could determine vehicle speed based on multiple inputs selected from, but not limited to, the following: driven wheel speed, non-driven wheel speed, propulsive torque, engine speed and accelerometers. The vehicle 10 also has a rotatable ground engaging member speed sensor. In the present implementation, the rotatable ground engaging member speed sensor is a wheel speed sensor 324 that senses the speed of rotation of the rear wheel 16 (i.e. a driving wheel) and sends a signal representative of this speed to the control unit 150. The control unit obtains the signals from the speed sensor 322, 324 and determines the actual slip of the rear wheel 16 using these signals as described below. The vehicle 10 also has a brake lever position sensor 326 and an accelerator position sensor 328 sensing the positions of the brake lever 23 and the accelerator 22 respectively and sending signals representative of these positions to the control unit 150. The vehicle 10 also has a voltmeter 330 that senses a charge level of the battery 306 and sends a signal representative of the state of charge to the control unit 150.

Although a single control unit 150 is described herein as receiving the signals from all of the sensors and controlling most of the various components of the vehicle 10, it is contemplated that the functions of the control unit 150 could be separated between multiple control units and that each of these control units could communicate with one or more of the other control units. For example, it is contemplated that instead of having the single control unit 150, the vehicle 10 could have an engine control unit (ECU) responsible for the control of the engine 100, a transmission control unit (TCU) responsible for the control of the transmission 200 and the clutch actuator 205, a regeneration control unit (RCU) responsible for the control of the inverter 154 during regenerative braking, and a hybrid control unit (HCU) receiving the signals from the various sensors and responsible for the control of the motor 300, the control of the various components in response to a change in operation mode and for interfacing between the ECU, TCU and RCU. It is contemplated that the control unit 150 could be split into more or less control units than in the example provided above. It is also contemplated that a single control unit could be responsible for the functions of two or more of the control units provided in the above example. For example, the HCU and RCU could be combined in a single control unit. Therefore, it should be understood that the control unit 150 could be multiple control units 150.

The operation of the regenerative braking system of the vehicle 10 will now be briefly described. Regenerative braking is a method by which energy is recovered during braking of the vehicle 10. In the present implementation, the recovered energy is provided to the battery 306 to recharge the battery 306.

During regenerative braking, the clutch 204 is opened to disengage the engine 100 from the rear wheel 16, the motor 300 operates in the generator mode and the motor 300 applies a braking torque to the rear wheel 16.

The control unit 150 determines the speed of the vehicle 10 from the signal received from the vehicle speed sensor 322. The control unit 150 then determines an optimal, or "desired" slip of the rear wheel 16 based at least in part on the speed of the vehicle 10. The desired slip is the value of the slip of the rear wheel 16 that would provide the most efficient regeneration as determined from a function or a map as described in greater detail below. Conventional regenerative braking systems typically aim to increase the braking torque $T_b$ as much as possible without reaching critical slip and wheel lock. However, development of the present technology as shown that desired slip may be significantly less than critical slip, which is contrary to the aforementioned conventional teachings. Specifically, regenerative performance will increase as slip increases towards the desired slip, but will decrease as slip increases past desired slip towards the critical slip. The desired slip for a given vehicle can be determined experimentally. The control unit 150 then determines the speed of rotation of the rear wheel 16 from the signal received from the wheel speed sensor 324. The control unit 150 then determines the actual slip of the rear wheel 16 based at least in part on the speed of the vehicle 10 and the speed of rotation of the rear wheel 16. The control unit 150 then sends a signal to the inverter 154 to control the motor 300 in the generator mode such that the motor 300 applies a braking torque to the rear wheel 16 based at least in part on the desired slip and the actual slip such that the actual slip gets closer to the desired slip. It is contemplated that in some implementations the control unit 150 could send a signal to the inverter 154 to control the motor 300 in the generator mode such that the motor 300 applies a braking torque to the rear wheel 16 based on the desired slip alone or based on the desired slip in combination with at least one vehicle parameter other than actual slip.

Regenerative braking is initiated in response to a braking command being received by the control unit 150. The regenerative braking system can have one or more the following three operation modes: automatic, coast and manual. Each mode has a corresponding braking command. Implementations of these modes are described below.

Figure 6A:
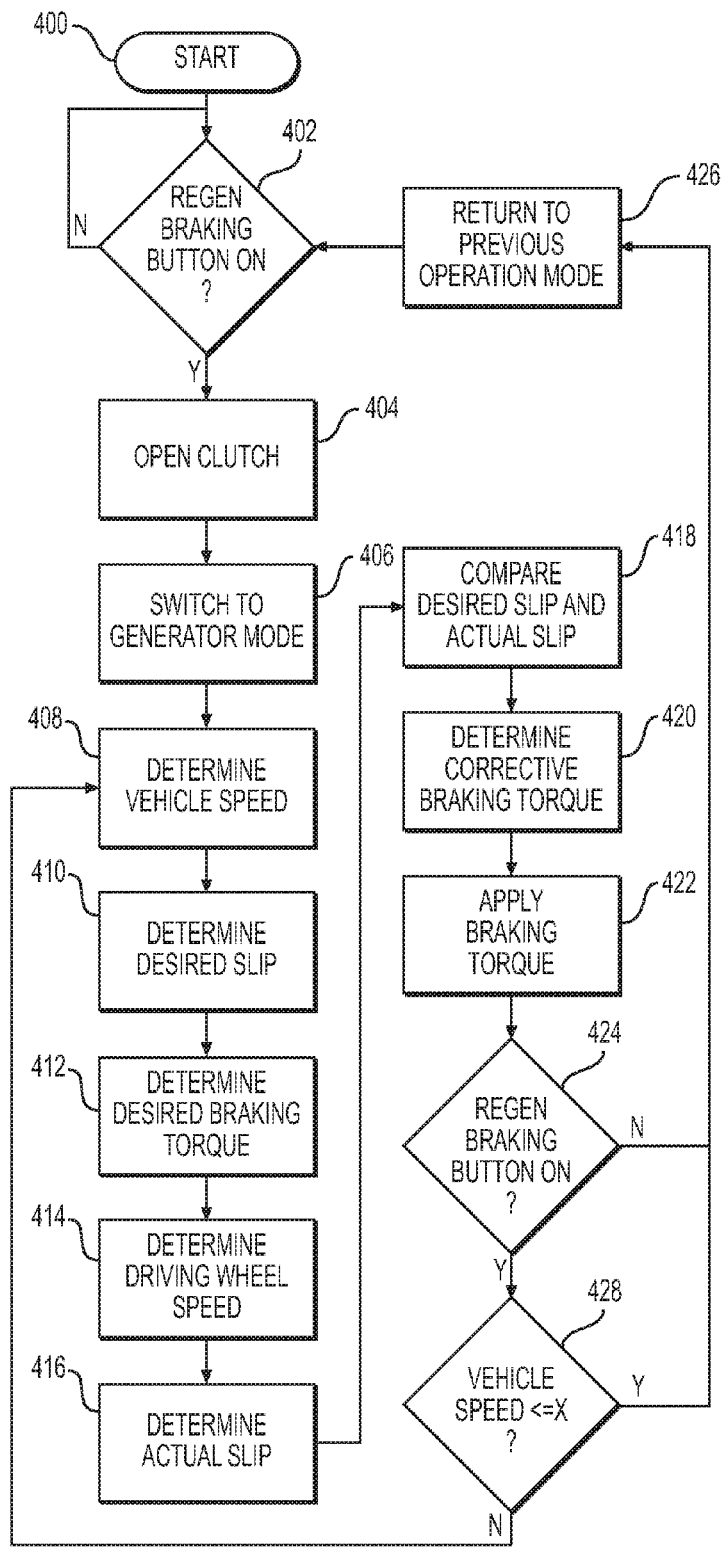
FIG. 6A is a logic diagram illustrating an implementation of a method for recovering energy during braking of the vehicle of FIG. 1.

With reference to FIG. 6A, an implementation of a method 400 for recovering energy in an automatic mode of regenerative braking will be described. At step 402, the control unit 150 determines if a signal has been received from the regenerative braking button 31 that indicates that the driver has pressed the regenerative braking button 31 (i.e. the button 31 is in the "on" position). Step 402 is repeated until the regenerative braking button 31 is pressed. This mode of regenerative braking is referred to herein as the automatic mode since once the driver actuates the regenerative braking button 31, the following steps of the method that result in regenerative braking occur without further driver intervention.

Once the control unit 150 determines that the regenerative control button 31 has been pressed at step 402, then at step 404 the control unit 150 sends a signal to the clutch actuator 205 to open the clutch 204, or to keep the clutch 204 open should it already be in this position, such that the engine 100 does not drive the wheel 16. Then at step 406, the control unit 150 sends a signal to the inverter 154 to control the motor 300 in the generator mode such that the motor 300 can apply a braking torque to the rear wheel 16 and generate energy used to recharge the battery 306. Following step 406, at step 408 the control unit 150 uses the signal received from the vehicle speed sensor 322 to determine the vehicle speed.

Then at step 410, by using the vehicle speed determined at step 408, the control unit 150 determines a desired slip of the rear wheel 16. As mentioned above, the desired slip is the value of the slip of the rear wheel 16 that would provide the most efficient regeneration, and therefore the most efficient recharging of the battery 306. In one implementation, the information regarding the desired slip is stored in a map stored on the permanent storage medium of the control unit 150. The map provides values of desired slip for various vehicle speeds. The desired slip for a vehicle speed that falls between two vehicle speeds on the map can be obtained through interpolation. The values of desired slip populating the map can be obtained experimentally or from a mathematical function based on a mathematical model of the vehicle 10. The function takes the form of $\lambda_d=K_\lambda(v)$, where $\lambda_d$ is the desired slip and v is the vehicle speed. In another implementation, the control unit 150 calculates the desired slip in real time based on the vehicle speed determined at step 408 using the previously mentioned mathematical function.

Once the desired slip has been determined at step 410, then at step 412 the control unit 150 uses the desired slip determined at step 410 to determine the desired braking torque. The desired braking torque is the braking torque that when applied would provide the desired slip determined at step 410. In one implementation, the information regarding the desired braking torque is obtained from information stored in a map stored on the permanent storage medium of the control unit 150 and/or from a mathematical function. The map provides values of desired braking torques for various desired slips. The desired braking torque for a desired slip that falls between two desired slips on the map can be obtained through interpolation. The values of desired braking torques populating the map can be obtained experimentally or from a mathematical function based on a mathematical model of the vehicle 10. In another implementation, the control unit 150 calculates the desired braking torque in real time based on the desired slip determined at step 410 using the previously mentioned mathematical function.

Once the desired braking torque has been determined at step 412, then at step 414 the control unit 150 uses the signal received from the wheel speed sensor 324 to determine the speed of rotation of the rear wheel 16 (i.e. the driving wheel). Then at step 416, by comparing the vehicle speed determined at step 408 and the speed of rotation of the rear wheel 16, the control unit 150 determines the actual slip of the rear wheel 16. Basically, the control unit 150 calculates the tangential speed of the rear wheel 16 corresponding to the speed of rotation of the rear wheel 16 determined at step 414, the control unit 150 then subtracts the vehicle speed determined at step 408 from the tangential speed of the rear wheel 16, the control unit 150 then divides the result of the subtraction by the absolute value of the vehicle speed determined at step 408, and the result of the subtraction corresponds to the actual slip.

Although steps 410 to 416 are shown in FIG. 6A as occurring sequentially, it is contemplated that steps 414 and 416 could occur in parallel with steps 410 and 412. It is also contemplated that the order of steps 408 to 416 could vary from what is shown in FIG. 6A as long as step 410 occurs after step 408, step 412 occurs after step 410, and step 416 occurs after both steps 408 and 414.

From step 416, then at step 418 the control unit 150 compares the desired slip determined at step 410 to the actual slip determined at step 416. Then at step 420, based on the comparison made at step 418, the control unit 150 determines a corrective braking torque to be applied in order to get the actual slip closer to the desired slip. Then at step 422, the control unit 150 sends a signal to the inverter 154 to control the motor-generator 300 to apply a braking torque corresponding to a sum of the desired braking torque determined at step 412 and the corrective braking torque determined at step 420. Applying this braking torque causes energy to be recovered and this energy can be used to recharge the battery 306.

Following step 422, at step 424 the control unit 150 determines if a signal from the regenerative braking button 31 still indicates that the driver is pressing the regenerative braking button 31 (i.e. the button 31 is still in the "on" position). If the regenerative braking button 31 is no longer being pressed, then the control unit 150 advances to step 426. At step 426, the control unit stops controlling the motor-generator 300 in the regenerative braking mode and returns to controlling the vehicle 10 in the mode of operation that was in use before the regenerative braking button 31 was pressed at step 402 (i.e. ELECTRIC, ECO, CHARGE or SPORT mode). From step 426, the control unit 150 returns to step 402. If at step 424 the control unit 150 determines that the regenerative braking button 31 is still being pressed, then the control unit 150 continues to step 428. At step 428, the control unit 150 determines if the vehicle speed sensed by the vehicle speed sensor 322 is less than equal to a predetermined vehicle speed X. In one implementation, the predetermined vehicle speed X is 0 km/h, and therefore at step 428 the control unit 150 determines if the vehicle is stopped. In other implementation, the predetermined vehicle speed X is a low vehicle speed, such as 5 km/h for example. If at step 428 the vehicle speed sensed by the vehicle speed sensor 322 is less than or equal to the predetermined vehicle speed X, then the control unit advances to step 426 described above. If at step 428 the vehicle speed sensed by the vehicle speed sensor 322 greater than the predetermined vehicle speed X, then the control unit returns to step 408 described above.

It is contemplated that an additional step could be provided between steps between steps 426 and 408. It this additional step, the control unit 150 receives a signal from the accelerator position sensor 328 indicative of a position of the accelerator. If the control unit 150 determines based on this signal that the accelerator 22 is actuated, then the control unit 150 advances to step 426. If the control unit 150 determines based on this signal that the accelerator 22 is not actuated, then the control unit returns to step 408.

Figure 6B:
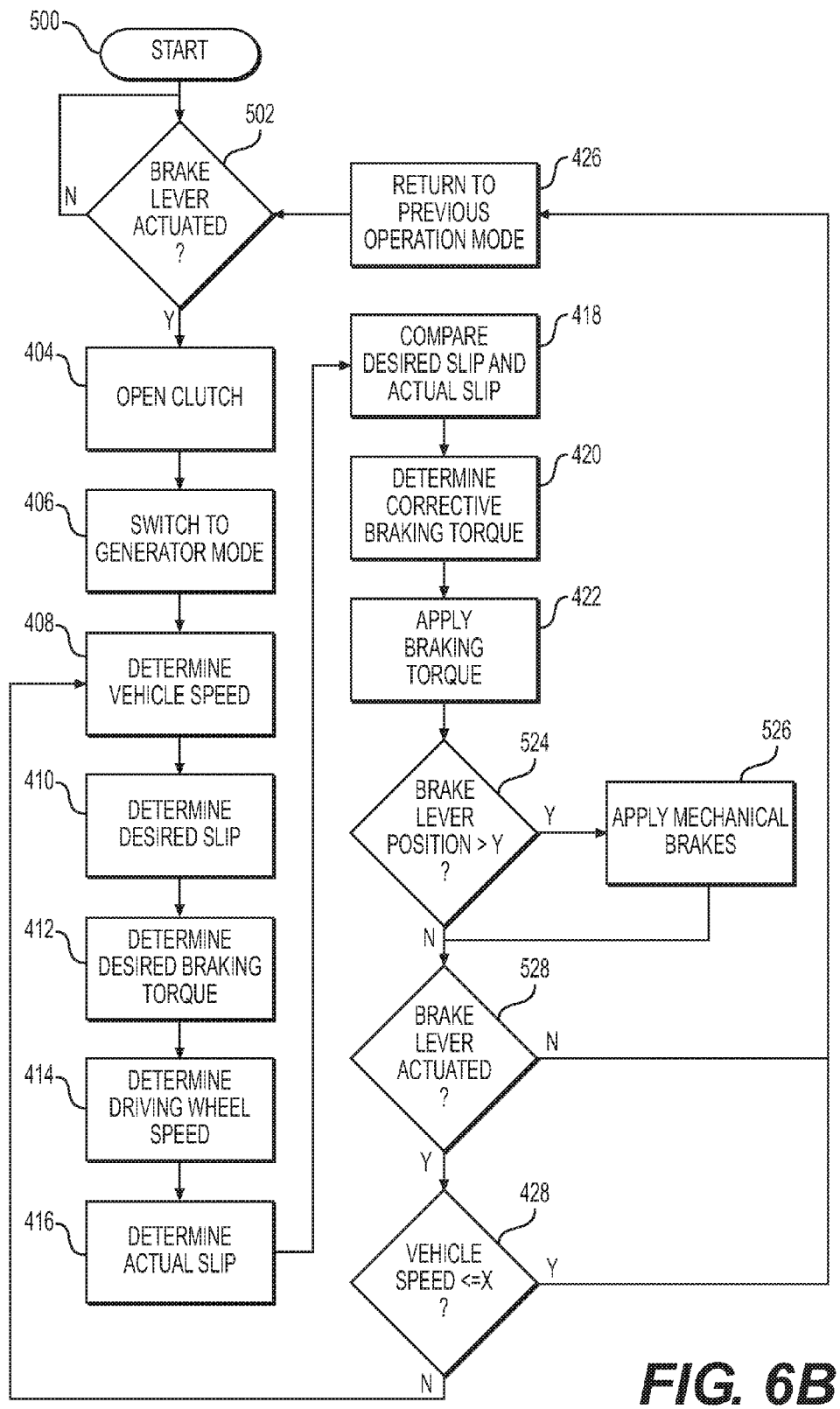
FIG. 6B is a logic diagram illustrating another implementation of a method for recovering energy during braking of the vehicle of FIG. 1.

With reference to FIG. 6B, an implementation of a method 500 for recovering energy in an alternative automatic mode of regenerative braking will be described. At step 502, the control unit 150 determines if a signal received from the brake lever position sensor 326 indicates that the driver has actuated the brake lever 23. Step 502 is repeated until the brake lever 23 is actuated. This mode of regenerative braking is referred to herein as the automatic mode since once the driver actuates the brake lever 23, the following steps of the method that result in regenerative braking occur without further driver intervention.

Once the control unit 150 determines that the brake lever 23 has been actuated at step 502, then the control unit 150 proceeds to step 404. The control unit 150 then performs steps 404 to 422 as in the method 400 described above. As such, these steps will not be explained again.

From step 422, at step 524 the control unit 150 determines if a signal received from the brake lever position sensor 326 indicates that the driver has actuated the brake lever 23 to a position greater than a predetermined position Y. If the brake lever 23 is at a position greater than the predetermined position Y, then at step 526 the control unit 150 sends a signal to brake actuators to apply the mechanical brakes of the vehicle 10. As a result, the braking torque from the mechanical brakes is added to the braking torque applied at step 422 and more braking torque is applied than would be applied by the motor-generator 300 alone. From step 536, the control unit 150 proceeds to step 528. If at step 524 the brake lever 23 is at a position less than or equal to the predetermined position Y, then the control unit 150 also proceeds to step 528.

As step 528, the control unit 150 determines if a signal received from the brake lever position sensor 326 indicates that the driver is still actuating the brake lever 23. If the brake lever 23 is no longer being actuated, the control unit 150 proceeds to step 426 and from step 426 proceeds to step 502. Step 426 is the same as step 426 described above with respect to the method 400 and as such will not be described again. If at step 528 the brake lever 23 is still actuated, then the control unit 150 proceeds to step 428. Step 428 is the same as step 428 described above with respect to the method 400 and as such will not be described again.

Figure 7:
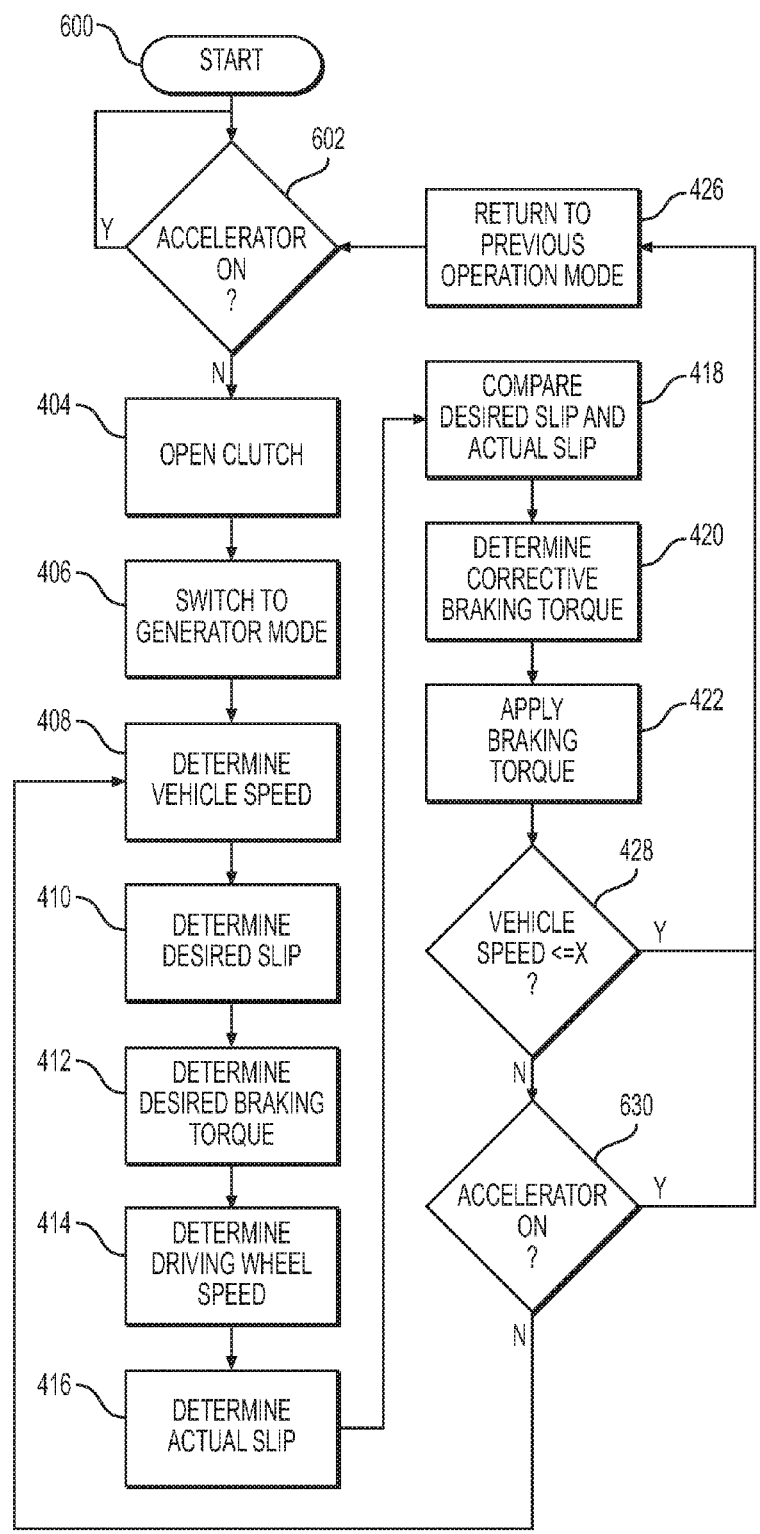
FIG. 7 is a logic diagram illustrating another implementation of a method for recovering energy during braking of the vehicle of FIG. 1.

With reference to FIG. 7, an implementation of a method 600 for recovering energy in a coast mode of regenerative braking will be described. At step 602, the control unit 150 determines if a signal received from the accelerator position sensor 328 indicates that the driver no longer actuates the accelerator 22 (i.e. the driver has released the accelerator 22 completely and the accelerator is now in the idle position). Step 602 is repeated until the accelerator 22 is no longer actuated. This mode of regenerative braking is referred to herein as the coast mode as it occurs when the driver releases the accelerator and desires to continue moving with the acquired momentum of the vehicle 10. Once the driver releases the accelerator 22 and it returns to the idle position, the following steps of the method that result in regenerative braking occur without further driver intervention.

Once the control unit 150 determines that the accelerator 22 is no longer being actuated at step 602, then the control unit 150 proceeds to step 404. The control unit 150 then performs steps 404 to 428 as in the method 400 described above. As such, these steps will not be explained again.

From step 428, the at step 630 the control unit 150 determines if a signal received from the accelerator position sensor 328 indicates that the driver has actuated the accelerator 22. If the accelerator 22 is actuated, the control unit 150 proceeds to step 426 and from step 426 proceeds to step 602. Step 426 is the same as step 426 described above with respect to the method 400 and as such will not be described again. If at step 630 the accelerator 22 is still not actuated, then the control unit 150 proceeds to step 408.

Figure 8:
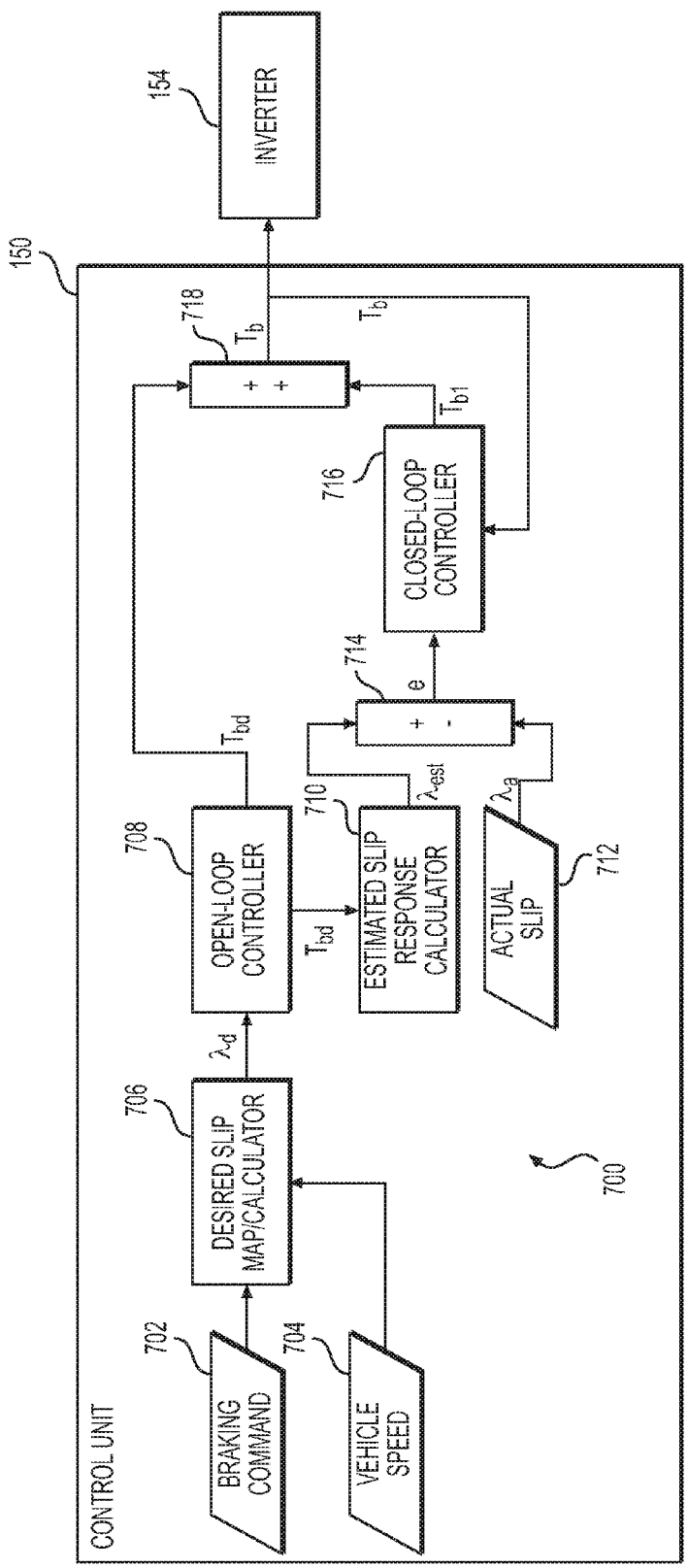
FIG. 8 is a schematic representation of an implementation a controller used for determining a braking torque to be applied by the electric motor of the vehicle of FIG. 1.

Turning now to FIG. 8, an implementation of controller used in the control unit 150 for determining a braking torque to be applied by the electric motor 300 of the vehicle 10 in the methods 400, 500 and 600 of FIGS. 6A, 6B and 7 respectively will be described.

As can be seen in FIG. 8, the controller has two main inputs: the braking command 702 and the vehicle speed 704. The braking command 702 can correspond to various conditions of various components of the vehicle 10. In the method 400 of FIG. 6A, the braking command 702 corresponds to the regenerative braking button 31 being actuated (i.e. step 402). In the method 500 of FIG. 6B, the braking command 702 corresponds to the brake lever 23 being actuated (i.e. step 502). In the method 600, the braking command 702 corresponds to the accelerator 22 not being actuated (i.e. step 602). As a result of releasing the accelerator 22, the vehicle 10 coasts and decelerates, as such for purposes of the present application, releasing the accelerator 22 such that it returns to its idle position is considered a braking command 702. The vehicle speed is obtained from the vehicle speed sensor 322 (i.e. step 408 of methods 400, 500, 600 in FIGS. 6A to 7).

The braking command 702 and the vehicle speed 704 are input into a desired slip map or desired slip calculator 706. The desired slip map/calculator 706 outputs a value of desired slip $\lambda_4$ as described above with respect step 410 of methods 400, 500, 600 in FIGS. 6A to 7. As described above, the desired slip $\lambda_4$ is the value of the slip of the rear wheel 16 that would provide the most efficient regeneration. In other words, the desired slip $\lambda_4$ is the value of the slip that results in the most power being returned by the electric-motor generator 300 to the battery 306 for the given vehicle speed 704 in order to recharge the battery 306.

The value of the desired slip $\lambda_4$ is then input into an open-loop controller 708. The open-loop controller 708 determines a value of a desired braking torque $T_{bd}$ that would provide the desired slip $\lambda_4$ as described above with respect to step 412 of methods 400, 500, 600 in FIGS. 6A to 7. The open-loop controller 708 also acts as a signal filter to prevent undesirable oscillations of the system.

The value of the desired braking torque $T_{bd}$ determined by the open-loop controller 708 is input into an adder 718 and into an estimated slip response calculator 710. The adder 718 will be described further below. The estimated slip response calculator 710 includes a mathematical model of the mechanical and electrical components of the vehicle 10. Based on this model, the estimated slip response calculator 710 determines a value of an estimated slip $\lambda_{est}$ of the rear wheel 16 that would occur in response to the application of the desired braking torque $T_{bd}$.

The value of the estimated slip $\lambda_{est}$ is input into a subtractor 714. The value of the actual slip $\lambda_a$ of the rear wheel 16 is also input into the subtractor 714. The actual slip $\lambda_a$ is determined as described above with respect to step 416 of methods 400, 500, 600 in FIGS. 6A to 7. The subtractor 714 subtracts the actual slip $\lambda_a$ from the estimated slip $\lambda_{est}$ to calculated an estimated error "e". This error "e" is then input into a closed-loop controller 716. The value of the currently applied braking torque $T_b$ being output from the adder 718 (see below) is also fed back into the closed-loop controller 716. The closed-loop controller 716 uses the error "e" and the braking torque $T_b$ received from the adder 718 and determines a value of a corrective braking torque $T_{bl}$. This value of the corrective braking torque $T_{bl}$ is input into the adder 718.

The adder 718 adds the value of the corrective braking torque $T_{bl}$ received from the closed-loop controller 716 and the value of the desired braking torque $T_{bd}$ received from the open-loop controller 708. The sum of these two values is the value of the braking torque $T_b$ that the control unit 150 sends to the inverter 154. The inverter 154 then controls the motor-generator 300 to apply the braking torque $T_b$. As described above, the value of the braking torque $T_b$ is also sent back to the closed-loop controller 716 to be used to calculate the corrective braking torque $T_{bl}$ to be used by the adder 718 in the next iteration.

Figure 9:
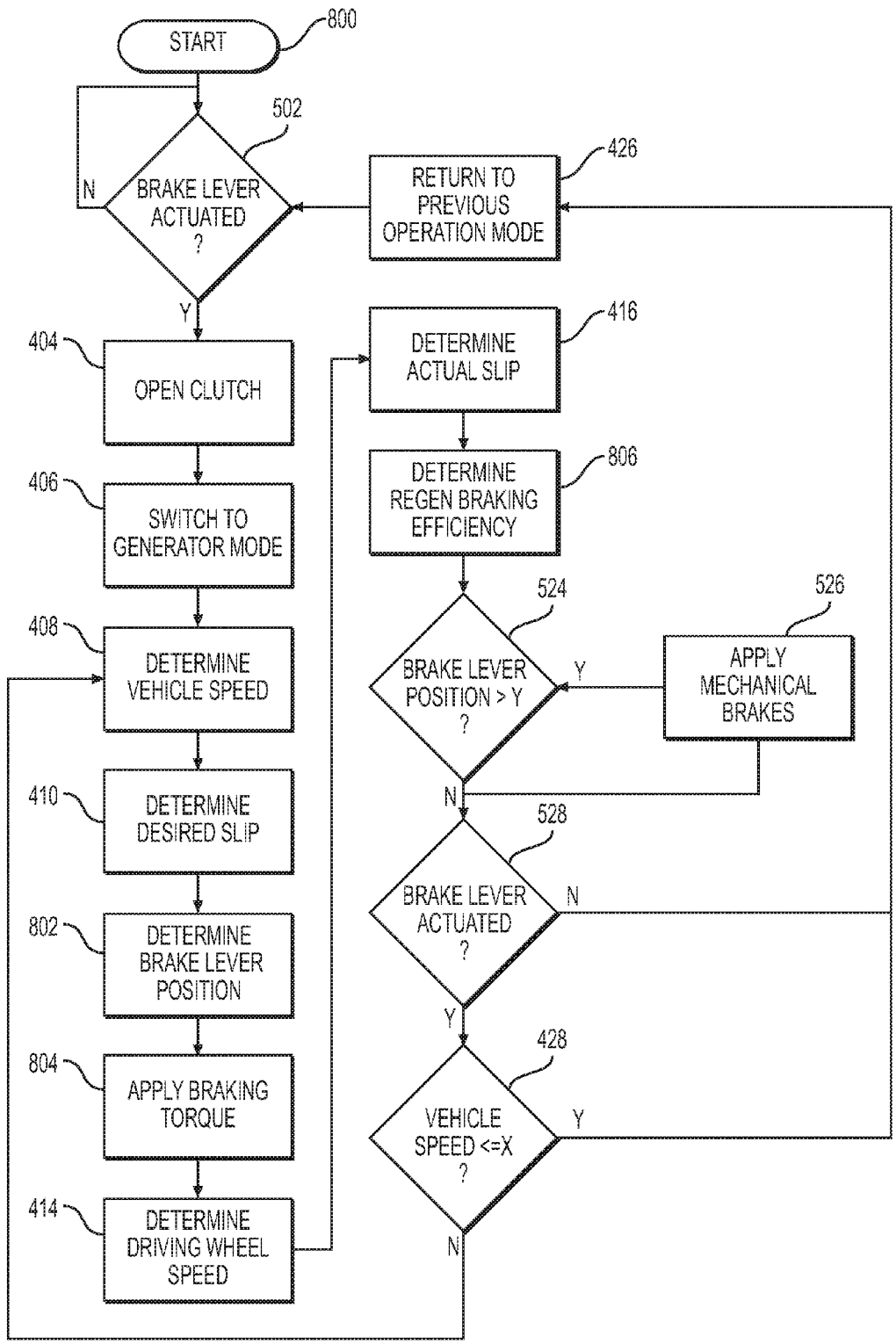
FIG. 9 is a logic diagram illustrating another implementation of a method for recovering energy during braking of a vehicle.

With reference to FIG. 9, an implementation of a method 800 for recovering energy in a coast mode of regenerative braking will be described. This mode is called "manual" since, the control unit adjusts the braking torque applied by the motor-generator 300 based at least in part on the position of the brake lever 23 set by the driver of the vehicle 10.

The method begins at step 502 and then proceeds to steps 404 to 410 as in the methods 400 and 500 described above with respect to FIGS. 6A and 6B. As such, these steps will not be described again. From step 410, the control unit 150 proceeds to step 802. At step 802, the control unit 150 receives a signal from the brake lever position sensor 326 that indicates the position of the brake lever 23 that has been set by the driver of the vehicle 10. Following step 802, at step 804 the control unit 150 calculates a braking torque to be applied by the motor-generator 300 that corresponds to the position of the brake lever 23 and sends a signal to the inverter 154 that then controls the motor-generator 300 to apply this braking torque. The braking torque applied increases as the degree of actuation of the braking lever 23 increases.

Figure 10B:
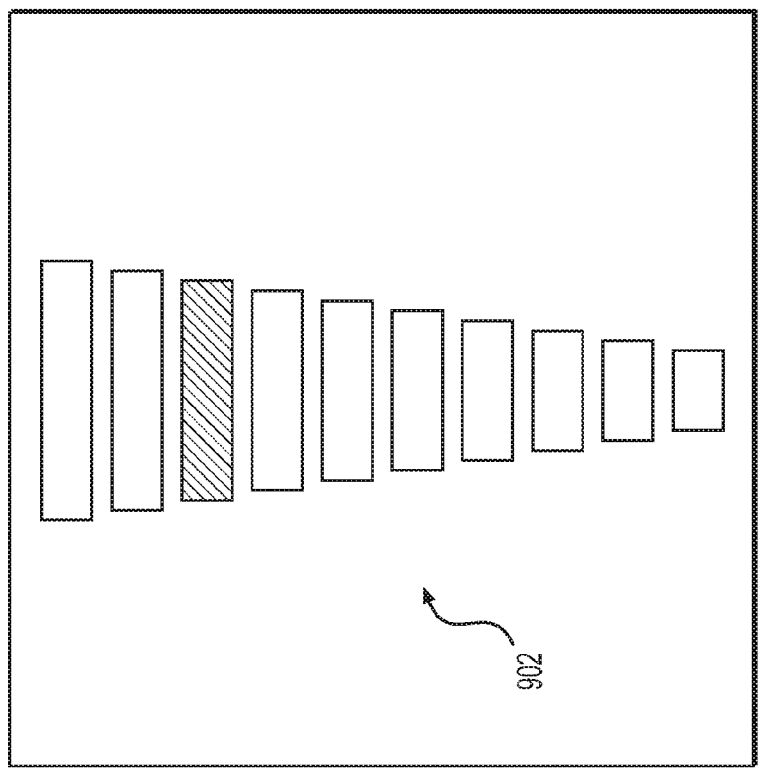
FIG. 10B illustrates another implementation of a regenerative braking performance graph used with the method illustrated in FIG. 9.
Figure 10A:
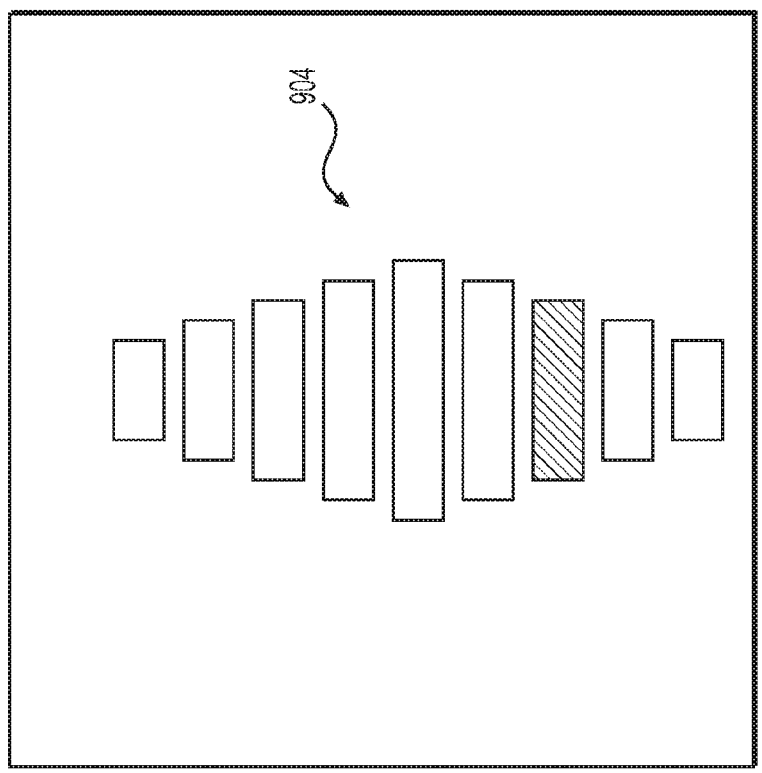
FIG. 10A illustrates an implementation of a regenerative braking performance graph used with the method illustrated in FIG. 9.

From step 804, the control unit 150 proceeds to steps 414 and 416 corresponding to steps 414 and 416 described above in the method 400 with respect to FIG. 6A. As such these steps will not be described again. From step 416, the control unit proceeds to step 806. At step 806, the control unit 150 calculates the regenerative braking performance and sends a signal to the display device 25 to display this performance. The driver can then, if he so desires, adjust the position of the brake lever 23 to increase the regenerative braking performance. The regenerative braking performance is calculated by comparing the regenerative braking efficiency for the actual slip determined at step 416 to the optimal regenerative braking efficiency corresponding to the desired slip determined at step 410. The regenerative braking performance increases as the difference between the desired slip and the actual slip decreases. It is contemplated that the regenerative braking performance can be displayed on the display device 25 in a number of different ways. In one example, the regenerative braking performance is displayed on the display device 25 as a percentage, with 100 percent corresponding to the actual slip of step 416 being equal to the desired slip of step 410. In another example, the regenerative braking performance is displayed as a color on the display device, with green being a good performance, orange being an average performance and red being a poor performance for example. In another example illustrated in FIG. 10A, the regenerative braking performance is illustrated on a bar graph 902. In the bar graph 902, wider bars indicate better performance and the bar corresponding to the current performance is illustrated in a different color. As can be seen, the graph has the narrowest bar (i.e. poor performance) at the bottom and the widest bar (i.e. great performance) at the top. A bar graph as the one illustrated in FIG. 10A may encourage the driver to brake as hard as possible. As mentioned above, there is no advantage to braking harder than what is needed to achieve desired slip, that achieving slip greater than the desired slip not only reduces regenerative performance but also brings the vehicle needlessly closer to critical slip and wheel lock. As such, in another example illustrated in FIG. 10B, the regenerative braking performance is illustrated on an alternate bar graph 904. In the bar graph 904, as in the bar graph 902, wider bars indicate better performance and the bar corresponding to the current performance is illustrated in a different color. As can be seen, the graph has the narrowest bars (i.e. poor performance) at the top and bottom and the widest bar (i.e. great performance) at the center. A bar graph such as the one illustrated in FIG. 10B gives the driver an indication of whether too much of too little braking is being applied to achieve optimal regenerative braking performance. As the driver may be encouraged by the graphs 902 or 904 to adjust the position of the brake lever 23, and therefore the braking torque, in order to approach the desired slip, the control unit 150, through the actions of the driver, will apply the braking torque to the rear wheel 16 using the motor-generator 300 based at least in part on the desired slip. Other ways of displaying the regenerative braking performance are also contemplated.

From step 806, the control unit 150 proceeds to steps 524 to 428 as in the method 500 described above with respect to FIG. 6B. As such, these steps will not be described again.

Modifications and improvements to the above-described implementations of the present technology may become apparent to those skilled in the art. The foregoing description is intended to be exemplary rather than limiting. The scope of the present technology is therefore intended to be limited solely by the scope of the appended claims.

What is claimed is:

1. A method for recovering energy during braking of a vehicle, the vehicle having at least one rotatable ground engaging member, a generator operatively connected to the at least one rotatable ground engaging member, and at least one energy storage device coupled to the generator, the method comprising:
   receiving a braking command generated at least in part in response to a braking actuator being actuated;
   determining a position of the braking actuator;
   determining a speed of the vehicle;
   determining a desired slip of the at least one rotatable ground engaging member based at least in part on the speed of the vehicle;
   determining a speed of rotation of the at least one rotatable ground engaging member;
   determining an actual slip of the at least one rotatable ground engaging member based at least in part on the speed of the vehicle and the speed of rotation of the at least one rotatable ground engaging member;
   in response to receiving the braking command, applying a braking torque to the at least one rotatable ground engaging member using the generator based at least in part on the desired slip and the position of the braking actuator; and
   displaying to a driver of the vehicle a graphical representation of a braking performance based at least in part on a difference between the actual slip and the desired slip.

2. The method of claim 1, further comprising:
   adjusting the braking torque based at least in part on the difference between the desired slip and the actual slip.

3. The method of claim 1, wherein:
   the braking actuator has a first position where the braking actuator is not actuated and a second position where the braking actuator is actuated; and
   the braking torque is applied and adjusted when the braking actuator is in the second position.

4. The method of claim 1, wherein:
   the generator is a motor-generator having a motor mode and a generator mode;
   the motor-generator applies a propulsive torque to the at least one rotatable ground engaging member when in the motor mode;
   the motor-generator applies the braking torque to the at least one rotatable ground engaging member when in the generator mode; and
   the method further comprises:
      switching from the motor mode to the generator mode in response to the braking command being received.

5. The method of claim 1, wherein:
   the at least one rotatable ground engaging member is at least one driving wheel of the vehicle;
   the vehicle also has at least one non-driving wheel; and
   determining a speed of the vehicle includes determining a speed of rotation of the at least one non-driving wheel.

6. The method of claim 1, wherein the desired slip is less than a critical slip of the at least one rotatable ground engaging member.

7. A regenerative braking system for a vehicle comprising:
   a generator adapted to be operatively connected to at least one rotatable ground engaging member of the vehicle;
   at least one energy storage device coupled to the generator;
   a control unit connected to the generator for controlling an operation of the generator; and
   a vehicle speed sensor connected to the control unit to send a signal representative of a speed of the vehicle to the control unit;
   a wheel speed sensor connected to the control unit to send a signal representative of a speed of rotation of the at least one rotatable ground engaging member to the control unit;
   the control unit having a permanent storage medium including machine-readable instructions causing, when executed, the control unit to:
      determine a position of the braking actuator based on a signal received from a braking actuator position sensor;
      determine a desired slip of the at least one rotatable ground engaging member based at least in part on the speed of the vehicle;
      determine an actual slip of the at least one rotatable ground engaging member based at least in part on the speed of the vehicle and the speed of rotation of the at least one rotatable ground engaging member;
      in response to receiving a braking command generated at least in part in response to the braking actuator being actuated, control the generator to apply a braking torque to the at least one rotatable ground engaging member based at least in part on the desired slip and the position of the braking actuator; and
      control a display of the vehicle to display to a driver of the vehicle a graphical representation of a braking performance based at least in part on a difference between the actual slip and the desired slip.

8. The system of claim 7, wherein the machine-readable instructions further cause, when executed, the control unit to:
   control the generator to adjust the braking torque based at least in part on the difference between the desired slip and the actual slip.

9. The system of claim 7, wherein:
the braking actuator has a first position where the braking actuator is not actuated and a second position where the braking actuator is actuated; and
the control unit controls the generator to apply and adjust the braking torque when the braking actuator is in the second position.

10. The system of claim 7, wherein:
the generator is a motor-generator having a motor mode and a generator mode;
the motor-generator being adapted to apply a propulsive torque to the at least one rotatable ground engaging member when in the motor mode;
the motor-generator being adapted to apply the braking torque to the at least one rotatable ground engaging member when in the generator mode; and
the machine-readable instructions further cause, when executed, the control unit to switch the motor-generator from the motor mode to the generator mode in response to a braking command being received.

11. The system of claim 10, wherein:
the vehicle also has an internal combustion engine selectively operatively connected to the at least one rotatable ground engaging member; and
the machine-readable instructions further cause, when executed, the control unit to send a signal to a clutch actuator to disengage the engine from the at least one rotatable ground engaging member in response to the braking command being received.

12. The system of claim 7, wherein:
the at least one rotatable ground engaging member is at least one driving wheel of the vehicle;
the vehicle also has at least one non-driving wheel; and
the vehicle speed sensor is a wheel speed sensor connected to the control unit to send a signal representative of a speed of rotation of the at least one non-driving wheel to the control unit.

13. The system of claim 7, wherein the desired slip is less than a critical slip of the at least one rotatable ground engaging member.

14. A regenerative braking system for a vehicle comprising:
a generator adapted to be operatively connected to at least one rotatable ground engaging member of the vehicle;
at least one energy storage device coupled to the generator;
a control unit connected to the generator for controlling an operation of the generator;
a display connected to the control unit;
a braking actuator position sensor connected to the control unit to send a signal representative of a position of a braking actuator of the vehicle;
a vehicle speed sensor connected to the control unit to send a signal representative of a speed of the vehicle to the control unit; and
a rotatable ground engaging member speed sensor connected to the control unit to send a signal representative of a speed of rotation of the at least one rotatable ground engaging member;
the control unit having a permanent storage medium including machine-readable instructions causing, when executed, the control unit to:
determine a desired slip of the at least one rotatable ground engaging member based at least in part on the speed of the vehicle;
control the generator to apply a braking torque to the at least one rotatable ground engaging member based at least in part on the position of the braking actuator;
determine an actual slip of the at least one rotatable ground engaging member based at least in part on the speed of the vehicle and the speed of rotation of the at least one rotatable ground engaging member; and
send instructions to the display device to display to a driver of the vehicle a graphical representation of a braking performance based at least in part on a difference between the actual slip and the desired slip.

15. The system of claim 14, wherein the graphical representation of the braking performance indicates if the actual slip is higher or lower than the desired slip.

* * * * *